(12) United States Patent
Marchand et al.

(10) Patent No.: US 11,347,834 B2
(45) Date of Patent: *May 31, 2022

(54) MOBILE ASSISTED TELEVISION SIGN IN USING DISCOVERY AND LAUNCH PROTOCOL

(71) Applicant: Google LLC, Mountain View, CA (US)

(72) Inventors: Julien Marchand, San Francisco, CA (US); Sophia Bong, San Francisco, CA (US); Daniel Kaemmerer, San Bruno, CA (US); Allan Mills, San Francisco, CA (US); Jaee Patwardhan, Sunnyvale, CA (US); Steven Wright, San Mateo, CA (US); Sana Mithani, San Bruno, CA (US); Nicolas Klein, San Francisco, CA (US); William Denniss, Redwood City, CA (US)

(73) Assignee: Google LLC, Mountain View, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 16/673,888

(22) Filed: Nov. 4, 2019

(65) Prior Publication Data
US 2020/0067901 A1    Feb. 27, 2020

Related U.S. Application Data

(63) Continuation of application No. 15/602,730, filed on May 23, 2017, now Pat. No. 10,469,474.

(51) Int. Cl.
*H04L 29/06* (2006.01)
*G06F 21/35* (2013.01)
(Continued)

(52) U.S. Cl.
CPC .............. *G06F 21/35* (2013.01); *H04L 63/08* (2013.01); *H04L 63/0853* (2013.01); *H04W 8/005* (2013.01); *H04W 12/068* (2021.01)

(58) Field of Classification Search
CPC .......... G06F 21/35; G06F 21/31; G06F 21/34; G06F 21/42; H04L 63/08; H04L 63/0853;
(Continued)

(56) References Cited

U.S. PATENT DOCUMENTS 8,627,438 B1 * 1/2014 Bhimanaik ............. G06F 21/36
                                                            726/9
9,565,475 B2    2/2017 Gunderson et al.
(Continued)

FOREIGN PATENT DOCUMENTS

EP    2 852 122    3/2015

OTHER PUBLICATIONS

Nguyen, Luan, "DIAL, Discovery And Launch Protocol Specification", Version 1.7.1, Sep. 23, 2015 (Year: 2015).*
(Continued)

*Primary Examiner* — Yogesh Paliwal
(74) *Attorney, Agent, or Firm* — Lowenstein Sandler LLP

(57) ABSTRACT

Implementations disclose methods and systems for facilitating an automated user login into a first application hosted by a first-screen device. A method includes detecting, by a second-screen device, a message transmitted by the first-screen device over a network; determining, based on the message, that the first application hosted by the first-screen device is requesting user authentication for the automated user login; presenting, via a second application hosted by the second-screen device, a prompt for user input indicating user acceptance of the automated user login; receiving the user input indicating the user acceptance of the automated user login; and responsive to the user input, transmitting an authentication code from the message to the server device to perform the user authentication for the automated user login into the first application.

20 Claims, 11 Drawing Sheets

(51) Int. Cl.
*H04W 8/00* (2009.01)
*H04W 12/06* (2021.01)

(58) Field of Classification Search
CPC .............. H04W 8/005; H04W 12/06; H04W 12/068; H04W 12/08; H04W 4/50
See application file for complete search history.

(56) References Cited

U.S. PATENT DOCUMENTS

| | | |
|---|---|---|
| 2014/0007211 A1 | 1/2014 | Yang et al. |
| 2014/0108623 A1 | 4/2014 | Gunderson et al. |
| 2014/0223525 A1* | 8/2014 | Fadida .................... G06F 21/35 726/6 |
| 2015/0089222 A1 | 3/2015 | White et al. |
| 2015/0128240 A1* | 5/2015 | Richards ............ H04L 63/0861 726/7 |
| 2015/0350597 A1* | 12/2015 | Lin .................. H04N 21/41407 348/14.02 |
| 2015/0381606 A1 | 12/2015 | Srivastav |
| 2016/0344730 A1 | 11/2016 | Holz |
| 2017/0019394 A1 | 1/2017 | Yastrebenetsky et al. |

OTHER PUBLICATIONS

International Search Report and Written Opinion dated Jun. 8, 2018, on PCT/US2018/021131.

* cited by examiner

MOBILE ASSISTED TELEVISION SIGN IN USING DISCOVERY AND LAUNCH PROTOCOL

RELATED APPLICATION

This application is a continuation application of U.S. patent application Ser. No. 15/602,730, filed on May 23, 2017, the entire contents of which are hereby incorporated by reference herein.

TECHNICAL FIELD

This disclosure relates to the field of assisted sign in and, in particular, assisted sign in to a first-screen device.

BACKGROUND

A first-screen device, such as a network-connected television, can host applications. An application hosted by a first-screen-device can display data, such as media items, received from a server device via a network. A user can sign into an application hosted by a first-screen device to display personalized data, such as playlists of the user via the application.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method is for facilitating an automated user login into a first application hosted by a first-screen device and the method includes detecting, by a second-screen device, a message transmitted by the first-screen device over a network, the message comprising an authentication code provided to the first-screen device by a server device; determining, based on the message, that the first application hosted by the first-screen device is requesting user authentication for the automated user login; presenting, via a second application hosted by the second-screen device, a prompt for user input indicating user acceptance of the automated user login; receiving the user input indicating the user acceptance of the automated user login; and responsive to the user input, transmitting the authentication code from the message to the server device to perform the user authentication for the automated user login into the first application hosted by the first-screen device.

In one implementation, the method further includes: identifying the first-screen device by transmitting a first Simple Service Discovery Protocol (SSDP) message to the first-screen device over the network and receiving a second SSDP message from the first-screen device over the network; and responsive to the identifying of the first-screen device, transmitting a first message to the first-screen device to determine whether the first-screen device is requesting the user authentication for the automated user login, wherein the message is transmitted by the first-screen device in response to the transmitting of the first message.

In one implementation, the user input further indicates a selection of an account, wherein the automated user login into the first application is with respect to the account.

In one implementation, the transmitting of the authentication code to the server device further comprises transmitting the selection of the account for the automated user login.

In one implementation, the message is a Discovery and Launch (DIAL) Uniform Resource Locator (URL) response to a DIAL URL request transmitted by the second-screen device.

In one implementation, the determining that the first application is requesting the user authentication for the automated user login comprises decoding the message to identify the authentication code.

In one implementation, the server device is to perform the user authentication for user login into the second application hosted by the second-screen device prior to the receiving of the user input indicating the user acceptance of the automated user login.

In an aspect of the disclosure, a non-transitory machine-readable storage medium storing instructions which, when executed cause a processing device of a first-screen device to perform operations for facilitating an automated user login into a first application hosted by the first-screen device, the operations including: transmitting, to a server device, a request for user authentication for the automated user login into the first application; receiving, from the server device, an authentication code; generating a message comprising the authentication code; transmitting, via the first-screen device over a network, the message intended for a second-screen device to prompt a user of the second-screen device to indicate acceptance of the automated user login; and receiving, from the server device, credentials to perform the user authentication for the automated user login into the first application, the received credentials indicating that the authentication code from the message has been provided to the server device by the second-screen device.

In one implementation, the operations further include: receiving, via the first application, second user input requesting the user authentication for the automated user login into the first application before the transmitting of the request.

In one implementation, the operations further include: receiving a first Simple Service Discovery Protocol (SSDP) message from the second-screen device over the network to identify the first-screen device; transmitting a second SSDP message to the second-screen device over the network in response to the first SSDP message, wherein the first-screen device is to be identified by the second-screen device in response to the transmitting of the second SSDP message; and responsive to being identified by the second-screen device, receiving a first message from the second-screen device, wherein the transmitting of the message is in response to the receiving of the first message.

In one implementation, the message is to be detected by the second-screen device; a prompt is to be presented by the second-screen device for user input indicating the acceptance of the automated user login and a selection of an account; and the automated user login into the first application is with respect to the account.

In one implementation, the authentication code and the selection of the account for the automated user login are to be transmitted by the second-screen device to the server device in response to the second-screen device receiving the user input.

In one implementation, the server device is to perform the user authentication for user login into a second application hosted by the second-screen device prior to the authentication code and the selection of the account for the automated user login being transmitted by the second-screen device to the server device.

In one implementation, the message is a Discovery and Launch (DIAL) Uniform Resource Locator (URL) response to a DIAL URL request transmitted by the second-screen device.

In an aspect of the disclosure, a system including: a memory to store instructions for facilitating an automated user login into a first application hosted by a first-screen device; and a processing device communicably coupled to the memory, the processing device to execute the instructions to: receive, from the first-screen device, a request for user authentication for the automated user login into the first application hosted by the first-screen device; generate an authentication code for the automated user login into the first application hosted by the first-screen device; transmit, to the first-screen device, the authentication code intended for the first-screen device to generate a message including the authentication code and to transmit the message to a second-screen device; receive, from the second-screen device, the authentication code from the message; and in response to receiving the authentication code from the second-screen device, transmit, to the first-screen device, credentials to perform the user authentication for the automated user login into the first application.

In one implementation, the message is to be detected by the second-screen device; a prompt is to be presented by a second application hosted by the second-screen device for user input indicating acceptance of the automated user login subsequent to detecting the message; and the authentication code is transmitted by the second-screen device to the processing device in response to the user input.

In one implementation, the user input further indicates a selection of an account; and the automated user login into the first application is with respect to the account.

In one implementation, the selection of the account is transmitted by the second-screen device to the processing device in response to the second-screen device receiving the user input.

In one implementation, processing device is to perform the user authentication for user login into the second application hosted by the second-screen device prior to transmitting the credentials to the first-screen device to perform the user authentication for the automated user login into the first application.

In one implementation, the message is a Discovery and Launch (DIAL) Uniform Resource Locator (URL) response to a DIAL URL request transmitted by the second-screen device.

BRIEF DESCRIPTION OF THE DRAWINGS

The present disclosure is illustrated by way of example, and not by way of limitation, in the figures of the accompanying drawings.

DETAILED DESCRIPTION

Figure 1:
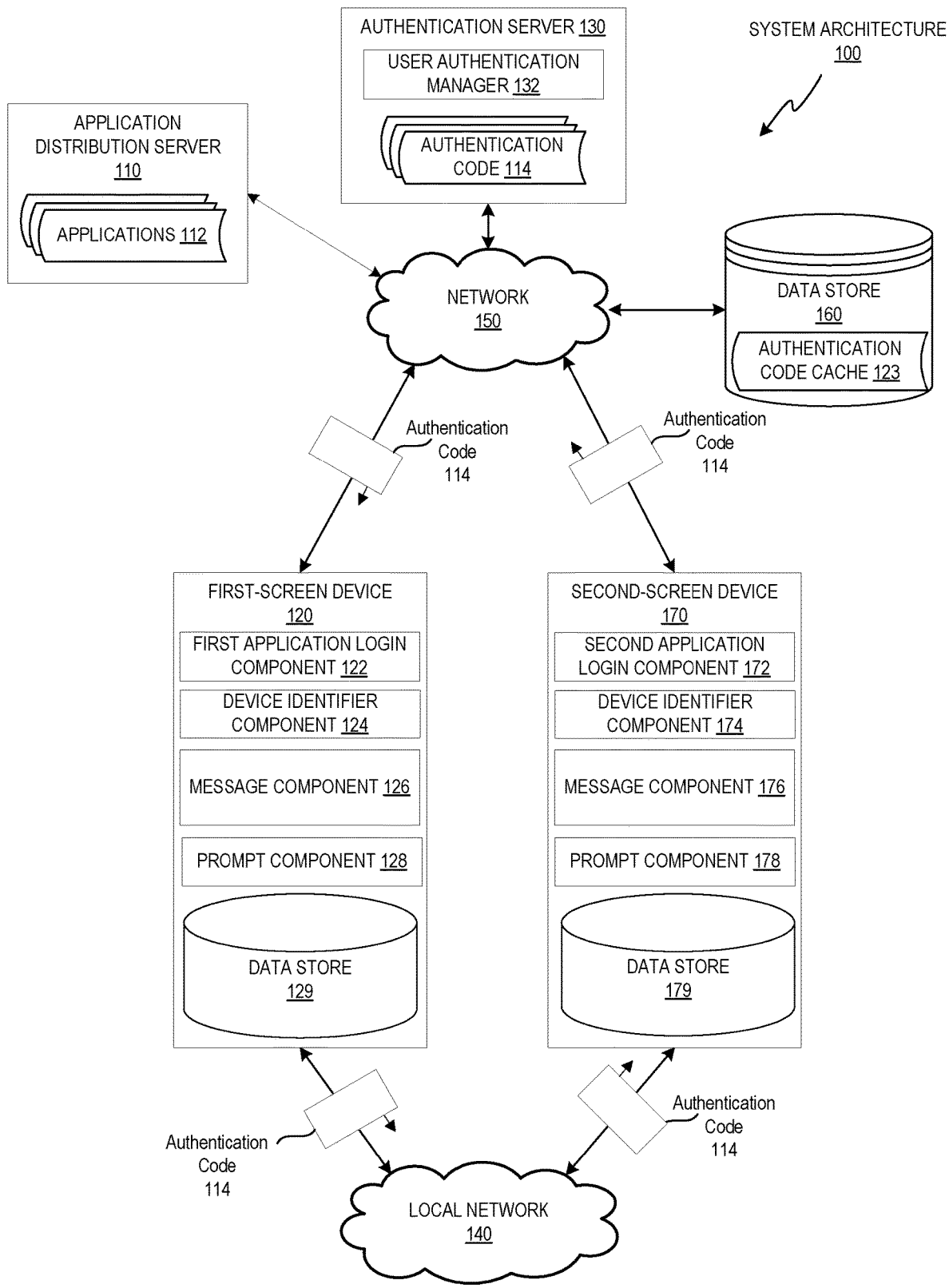
FIG. 1 is a block diagram illustrating an exemplary system architecture, in accordance with an implementation of the disclosure.

Aspects and implementations of the disclosure are directed to an automated sign-in into a first screen device. A first-screen device may be a network-connected television device ("smart TV"), over-the-top (OTT) streaming devices, set top boxes, Blu-ray players, operator boxes, etc. An operating system runs on a first-screen device and may provide a platform for applications to be hosted by the first-screen device. Applications can be preloaded on the first-screen device and/or installed on the first-screen device via an application distribution platform. Applications running on a first-screen device can provide access to platforms via a network for one or more of media-sharing, making purchases, social networking, playback of media items, etc. A user can sign into and perform account authentication in an application hosted by a first-screen device to access playlists saved to an account, make purchases via an account, access a social network corresponding to an account, etc. Signing in and account authentication on first-screen devices is typically a laborious process for a user.

A user typically uses a d-pad based infrared remote control to interact with a first-screen device and to interact with applications hosted by the first-screen device. A d-pad may be a flat, four-way directional control with one button on each of the four points (e.g., up, down, left, and right). Another button on the d-pad or other portion of the remote control may be to select (e.g., an enter button). An application may display an alphanumeric keyboard via the first-screen device. One conventional form of authentication includes the user entering a username and password by navigating to individual characters one-by-one by selecting the up, down, left, and right buttons on the d-pad and then selecting an enter button to select the character. The navigating to and selecting each character with the remote control may take a long time, is error prone, and discourages users from using applications hosted by first-screen devices.

Another conventional form of authentication is a cross-device assisted authentication to sign into an application hosted by a first-screen device. The user uses the remote control to request that a code be displayed on the first-screen device. The user then launches a web browser on a mobile device and types a specific web address of an activate page (e.g., a domain.com/activate type of web end point) character-by-character into the web browser via the mobile device. The activate page prompts the user to enter a username and password via the mobile device to sign into an account. The activate page also prompts the user to enter the code displayed on the first-screen device. After entering of the web address, the username, the password, and the code into the mobile device, a server device may login the user into the application hosted by the first-screen device. The entering of the web address, the username, the password, and the code into the mobile device may be time consuming and error prone, and may discourage users from using applications hosted by the first-screen devices.

Conventional forms of authentication are tedious and present limitations and drawbacks from a technical security perspective and also from a user understanding and ease of use perspective. In using conventional forms of authentication, users suffer from setup fatigue. If the process is not quick and easy, fewer users will take the time to go through the flow. Conventional forms of authentication suffer from limited input options. Entering of text (especially passwords) is difficult and clunky using a remote control. Entering of a specific web address (which may be long and difficult to remember and type in), a username, a password, and a code, all before the code times out is difficult using a mobile device. Conventional forms of authentication also suffer from technical constraints. Signing into accounts is limited by some authentication servers to web pages hosted by a specific authentication server due to policies and security.

Aspects of the present disclosure address the above and other deficiencies by facilitating automated user login into a first application hosted by a first-screen device. A first-screen device may receive an authentication code from a server device, generate a message including the authentication code, and transmit the message. A second-screen device (e.g., a smart phone, a tablet computer, a laptop, etc.) may receive the message, present a prompt for user input via a second application hosted by the second-screen device, and receive the user input indicating user acceptance of the automated user login. Responsive to the user input, the second-screen device may transmit the authentication code from the message to the server device to perform the user authentication for the automated user login into the first application. In one implementation, the prompt for user input is an acceptance element corresponding to an account and the user input is selecting (e.g., clicking on) the acceptance element. From the user perspective, the automated user login is easy to comprehend, is easy to find, is easy to use, is secure, and reduces or altogether eliminates the need to type with a cumbersome d-pad remote.

Accordingly, by facilitating automated user login into a first application hosted by a first-screen device, significantly more users may sign into applications hosted by first-screen devices, which in turn increases the popularity among users of first-screen devices and applications hosted by the first-screen devices.

FIG. 1 illustrates an example system architecture 100, in accordance with one implementation of the disclosure. The system architecture 100 includes application distribution server 110, first-screen device 120, authentication server 130, local network 140, a network 150, a data store 160, and a second-screen device 170.

Application distribution server 110 may be one or more computing devices (such as a rackmount server, a router computer, a server computer, a personal computer, a mainframe computer, a laptop computer, a tablet computer, a desktop computer, etc.), data stores (e.g., hard disks, memories, databases, etc.), networks, software components, and/or hardware components. The application distribution server 110 may be used to provide a user with access to applications 112 (e.g., the application distribution server 110 may host the applications 112). The application distribution server may provide the applications 112 to the user (e.g., a user may select an application 112 and download the application 112 from the application distribution server 110 in response to requesting or purchasing the application 112). Application distribution server 110 may be a part of an application distribution platform (e.g., application distribution service) that may allow users to consume, develop, upload, download, rate, share, search for, approve of ("like"), dislike, and/or comment on applications 112. The application distribution platform may also include a website (e.g., a webpage) or application back-end software that may be used to provide a user with access to the applications 112.

Application distribution server 110 may host content, such as applications 112. Applications 112 may be digital content chosen by a user, digital content made available by a user, digital content developed by a user, digital content uploaded by a user, digital content developed by a content provider (e.g., application developer), digital content uploaded by a content provider (e.g., application developer), digital content provided by the application distribution server 110, etc. Examples of applications 112 include, and are not limited to, mobile applications, smart television applications, first-screen device applications, second-screen device applications, desktop applications, software applications, etc. Applications 112 may display social media updates, digital video, digital movies, digital photos, digital music, website content, social media updates, electronic books (eBooks), electronic magazines, digital newspapers, digital audio books, electronic journals, web blogs, real simple syndication (RSS) feeds, electronic comic books, software applications, etc.

Applications 112 may be consumed via a web browser on the first-screen device 120 and second-screen device 170 and/or via an app store on second-screen device 170. As used herein, "application," "mobile application," "smart television application," "first-screen device application," "second-screen device application," "desktop application," "software application," "digital content," "content," and "content item," can include an electronic file that can be executed or loaded using software, firmware or hardware configured to present the application 112 to an entity. In one implementation, the application distribution platform may store the applications 112 using the data store 160. Applications 112 may be presented to and/or downloaded by a user of first-screen device 120 and second-screen device 170 from application distribution server 110 or an application distribution platform. According to aspects of the disclosure, an application 112 may allow users to interact with a prompt, watch content, make a purchase, participate in a conversation, etc. Application 112 may include an embedded media player (as well as other components) to play content provided by a content platform or stored locally. The content platform (not shown) may be, for example, a media sharing platform or a social networking platform, and may be used to provide a user with access to media items and/or provide the media items to the user. For example, the content platform may allow a user to consume, upload, search for, approve of ("like"), dislike, and/or comment on media items. Application distribution server 110 may be part of the content platform, be an independent system or be part of a different platform.

Application distribution server 110 may host a set of applications 112 that are each formatted for a corresponding device, a corresponding operating system, a corresponding version of operating system, a corresponding browser, a corresponding size of user interface, etc. For example, application distribution server 110 may host a set of applications 112 that includes a first application and a second application. The first application may correspond to a first-screen device 120 (e.g., a smart television) and the second application may correspond to a second-screen device 170 (e.g., a mobile device). The first application and the second application may be associated with the content platform (e.g., a media sharing platform or a social networking platform) and may present content provided by the content platform. In response to a first-screen device 120 transmitting a request for an application 112 associated with the content platform, the application distribution server 110 may identify a first application that is associated with the content platform and corresponds to the first-screen device 120 (e.g., corresponds to the type of device, type of operating system, type of browser, etc. of first-screen device 120), and transmit the first application 602 to the first-screen device 120. In response to a second-screen device 170 transmitting a request for an application 112 associated with the content platform, the application distribution server 110 may identify a second application 702 that is associated with the content platform and corresponds to the second-screen device 170 (e.g., corresponds to the type of device, type of operating system, etc. of second-screen device 107), and transmit the second application 702 to the second-screen device 170. In some implementations, if the user of the first-screen device 120 is the same as the user of the second screen device 170, the first application and the second application may be linked to the same account on the content platform (e.g., once the first application and the second application are installed on the first-screen device 120 and the second screen device 170 respectively).

In some implementations, system architecture 100 may also include an authentication server 130 coupled to first-screen device 120 and second-screen device 170 via network 150 to facilitate automated user login into a first application hosted by the first-screen device 120. In one implementation, authentication server 130 may be part of the content platform. In another implementation, authentication server 130 may be an independent platform including one or more computing devices such as a rackmount server, a router computer, a server computer, a personal computer, a mainframe computer, a laptop computer, a tablet computer, a desktop computer, etc.

Authentication server 130 may include a user authentication manager 132. User authentication manager 132 may receive a request from a first-screen device 120 for user authentication for automated user login into a first application 602 hosted by the first-screen device 120. The user authentication manager 132 may generate an authentication code 114 and transmit the authentication code 114 to the first-screen device 120. The user authentication manager 132 may store the authentication code 114 in data store 160. Subsequently, the user authentication manager may receive the authentication code 114 from the second-screen device 170 and perform user authentication for the automated user login into the first application 602 hosted by the first-screen device 120. The user authentication manager 132 may compare the authentication code 114 received from the second-screen device 170 with the authentication code 114 stored in the data store 160 to determine that the authentication codes match. The user authentication manager 132 may receive an indication of an account from the second-screen device 170 and may perform the user authentication for the automated user login into the account in the first application 602.

Data store 160 may include an authentication code cache 123 to store authentication codes 114 that are generated by the authentication server 130 and transmitted to a first-screen device 120.

First-screen device 120 may include computing devices such as network-connected televisions ("smart TV"), network-connected media players (e.g., Blu-ray player), a set-top-box, over-the-top (OTT) streaming devices, operator boxes, etc. Second-screen device 170 may include computing devices such as personal computers (PCs), laptops, mobile phones, smart phones, tablet computers, netbook computers, etc. First-screen device 120 and second-screen device 170 may be capable of receiving (e.g., downloading) applications 112 from application distribution server 110 over a network 150. First-screen device 120 and second-screen device 170 may contact servers (e.g., application distribution server 110, authentication server 130, etc.) and platforms (e.g., application distribution platform, media sharing platform, social networking platform, etc.) via network 150 and execute applications 112 independent of each other. For example, first-screen device 120 can launch an application 112 and a media server of the content platform can stream media content to the application 112 executing on the first-screen device 120 without interaction with or assistance from the second-screen device 170. A first-screen device 120 may not have account/profile management software (e.g., may not include single sign on (SSO) capabilities). First-screen device 120 and second-screen device 170 may be capable of receiving and transmitting messages (e.g., SSDP message, Discovery and Launch (DIAL) message (e.g., DIAL URL query, DIAL URL response, etc.)) over the network 150 and/or local network 140.

In response to first-screen device 120 and second screen device 170 being on the same network (e.g., local network), the second-screen device 170 may (e.g. using a protocol, using the DIAL protocol, etc.) to discover first-screen devices 120, search for (e.g., discover) applications 112 on first-screen devices 120, launch applications 112 on first-screen devices 120, and stop applications 112 on first-screen devices 120. For example, a second-screen device 170 may launch an application 112 on a first-screen device 120 and send a URL to the first-screen device 120 so that the first-screen device can access a video file via the URL directly from a media server of the content platform. Independent of second-screen devices 170, a first-screen device 120 may also search for, launch, and stop applications 112 (e.g., a user may use a remote control to search, launch, and stop applications 112 on the first-screen device 120). The applications 112 may run on the first-screen device 120 and receive data directly from server devices (e.g., rather than being streamed from the server device to the second-screen device 170 and then to the first-screen device 120). Running applications 112 on the first-screen device 120 independent from the second-screen device 170 is beneficial for conditions when the local network 140 has low available bandwidth, the second-screen device 170 has low capacity (e.g., low or dead battery on a mobile device), etc. An application 112 may be executing on the first-screen device 120 at the same time a different application 112 is executing on the second-screen device 170. For example, the first-screen device 120 may execute an application associated with the media sharing platform while the second-screen device executes an application associated with a social networking platform.

Local network 140 may be a computing network that provides one or more communication channels between first-screen device 120 and second-screen device 170. In one example, local network 140 may be a peer-to-peer network that does not rely on a pre-existing network infrastructure (e.g., access points, switches, routers) and first-screen device 120 and second-screen device 170 may replace the networking infrastructure to route communications between the user devices. Local network 140 may be a wireless network that is self-configuring and enables first-screen device 120 and second-screen device 170 to contribute to local network 140 and dynamically connect and disconnect from local network 140 (e.g., ad hoc wireless network). In another example, local network 140 may be a computing network that includes networking infrastructure that enables user devices to communicate with other user devices. In the latter example, local network 140 may or may not have access to the public network (e.g., internet). For example, a vehicle (e.g., bus, train) or location (e.g., classroom, library, café, etc.) may provide an access point or user device that may function as an access point to enable user devices to communicate with one another without providing internet access. Alternatively, the local network 140 may provide access to a larger network such as network 150 (e.g., Internet). In one implementation, local network 140 may be based on any wireless or wired communication technology and may connect a first user device directly or indirectly (e.g., involving an intermediate user device) to a second user device. The wireless communication technology may include Bluetooth®, Wi-Fi®, infrared, ultrasonic, or other technology. The wired communication may include universal serial bus (USB), Ethernet, RS 232, or other wired connection. The local network 140 may be an individual connection between two devices or may include multiple connections.

Network 150 may be a public network that provides first-screen device 120 and second-screen device 170 with access to application distribution server 110, authentication server 130, and other publically available computing devices. Network 150 may include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, and/or a combination thereof.

Each of first-screen device 120 and second-screen device 170 may include an operating system that allows users to execute applications 112. The application 112 may include a media viewer, a web browser, etc. to present images, videos, audio, web pages, documents, etc. In one example, the application 112 may include a web browser that can access, retrieve, present, and/or navigate content (e.g., web pages such as Hyper Text Markup Language (HTML) pages, digital media items, text conversations, notifications, etc.) served by a web server. The application 112 may render, display, and/or present the content to a user. The application 112 may include an embedded media player (e.g., a Flash® player or an HTML5 player) (e.g., embedded in a web page that may provide information about a product sold by an online merchant). In another example, the application 112 may be a standalone application (e.g., a mobile application or app) that allows users to view digital media items (e.g., digital videos, digital images, electronic books, etc.), to participate in text conversations, and/or to receive prompts.

In the example shown in FIG. 1, first-screen device 120 may include a first application login component 122, a device identifier component 124, a message component 126, a prompt component 128, and a data store 129.

First application login component 122 may manage requests to login to a first application hosted by the first-screen device 120, receive the authentication code 114, and receive credentials to login to the first application. Device identifier component 124 may receive and send SSDP messages for the second-screen device 170 to identify the first-screen device. The message component 126 may receive, generate, and send messages (e.g., DIAL URL request, DIAL URL response, messages of another type of protocol, etc.) to transfer the authentication code 114 to the second-screen device 170. Prompt component 128 may display prompts and receive user input.

Data store 129 may be a memory (e.g., random access memory), a drive (e.g., a hard drive, a flash drive), a database system, or another type of component or device capable of storing data. Data store 129 may include multiple storage components (e.g., multiple drives or multiple databases) that may span multiple computing devices (e.g., multiple server computers).

In the example shown in FIG. 1, second-screen device 170 may include a second application login component 172, a device identifier component 174, a message component 176, a prompt component 178, and a data store 179.

Second application login component 172 may login to a second application hosted by the second-screen device 170. Device identifier component 174 may send and receive SSDP messages to identify the first-screen device 120 as being on the same network (e.g., local network 140) as the second-screen device 170. The message component 176 may send, receive, and decode messages (e.g., DIAL URL request, DIAL URL response, messages of another type of protocol, etc.) to determine the authentication code 114. Prompt component 178 may provide a prompt, receive user input indicating user acceptance of user authentication for the automated login of the first application hosted by the first-screen device 120, and transmit the authentication code to the authentication server 130.

Data store 179 may be a memory (e.g., random access memory), a drive (e.g., a hard drive, a flash drive), a database system, or another type of component or device capable of storing data. Data store 179 may include multiple storage components (e.g., multiple drives or multiple databases) that may span multiple computing devices (e.g., multiple server computers).

In general, functions described in one implementation as being performed on the first-screen device 120 and second-screen device 170 can also be performed by the application distribution server 110 and/or authentication server 130 in other implementations, if appropriate. For example, the authentication server 130 may identify the first-screen device 120 and the second-screen device 170 as being on the same network (e.g., network 150, local network 140). In another example, the application distribution server 110 may identify the first-screen device 120 and the second-screen device 170 as having downloaded applications 112 from the same set of applications 112 (e.g., a smart TV version and a mobile version of the same application 112).

In addition, the functions of a particular component can be performed by different or multiple components operating together. The application distribution platform, application distribution server 110, and authentication server 130 can also be accessed as a service provided to other systems or devices through appropriate application programming interfaces (API), and thus is not limited to use in websites and applications.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline of the application distribution platform.

Although implementations of the disclosure are discussed in terms of an application distribution server 110, authentication server 130, and an application distribution platform, implementations may also be generally applied to any type of social network providing content and connections between users.

In situations in which the systems discussed here collect personal information about users, or may make use of personal information, the users may be provided with an opportunity to control whether the application distribution platform collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the application distribution platform and what user information is transmitted to the application distribution server 110 and authentication server 130.

Figure 2A:
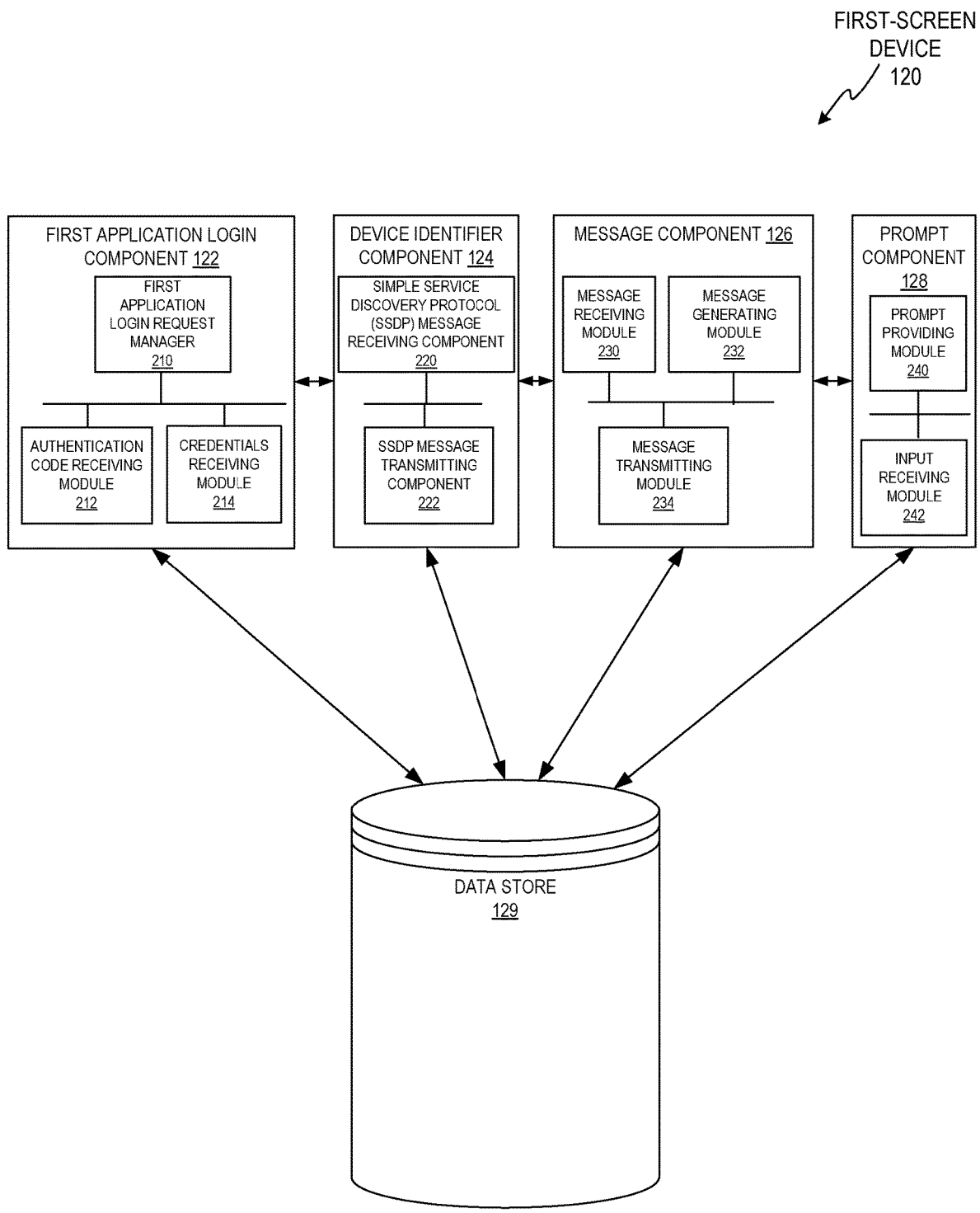
FIG. 2A is a block diagram illustrating the components and modules of a first-screen device, in accordance with an implementation of the disclosure.

FIG. 2A is a block diagram illustrating the first-screen device 120. In the example shown in FIG. 2A, the first-screen device 120 includes a first application login component 122, a device identifier component 124, a message component 126, and a prompt component 128 coupled to data store 129.

First application login component 122 includes a first application login request manager 210, authentication code receiving module 212, and credentials receiving module 214.

The first application login request manager 210 may receive user input requesting user authentication for automated user login into a first application. For example, the first application login request manager 210 may receive user input of launching the first application, of navigating to a login page, of selection of a login element, etc. The first application login request manager 210 may transmit a request for the user authentication for the automated user login into the first application to the authentication server 130. In some implementations, the request may be a request for an authentication code 114. In some implementations, the first application login request manager 210 may periodically send the request to the authentication server 130. The first application login request manager 210 may store the request in the data store 129 to later retrieve and resend to the authentication server 130.

The authentication code receiving module 212 may receive an authentication code 114 from the authentication server 130. The authentication code 114 may be received in response to the request for the user authentication. The credentials receiving module 214 may receive, from the authentication server 130, credentials for automated user login into the first application in response to the second-screen device 170 transmitting the authentication code 114 to the authentication server 130. The credentials may be for automated user login into the first application using a specific account.

Device identifier component 124 includes a SSDP message receiving component 220 and a SSDP message transmitting component 222. The SSDP message receiving component 220 may receive a first SSDP message over a network (e.g., local network 140) from the second-screen device 170. In some implementations, the SSDP message receiving component 220 detects a first SSDP broadcast message that is broadcast over the network by the second-screen device 170. The SSDP message transmitting component may transmit a second SSDP message to the second-screen device 170 over the network in response to the first SSDP message. In some implementations, device identifier components 124 and 174 use a different protocol other than SSDP. In some implementations, device identifier component 124 identifies the second-screen device 170 has being on the same network as the first-screen device 120.

The message component 126 may include a message receiving module 230, a message generating module 232, and a message transmitting module 234. The message receiving module 230 may receive a first message (e.g., a DIAL Application Status Hypertext Transfer Protocol (HTTP) request, a DIAL URL request, DIAL URL query, a query of the DIAL URL of the first-screen device 120, etc.) from the second-screen device 170. The first message may be inquiring whether the first application is requesting user authentication for the automated user login into the first application.

In some implementations, the message generating module 232 generates a message (e.g., a DIAL Application Status HTTP request response, a DIAL URL response) in response to receiving the first message. In some implementations, the message generating module 232 generates a message in response to having transmitted a request for user authentication to the authentication server 130 and having received the first message. In some implementations, the message generating module 232 generates a message in response to having received the authentication code from the authentication server 130 and having received the first message. In some implementations, the message generating module 232 generates a DIAL URL and appends the authentication code 114 to the DIAL URL to generate the message.

The message transmitting module 234 transmits the message to the second-screen device 170. The message transmitting module 234 may broadcast the message via the network and multiple devices communicably coupled to the network may detect the message.

Prompt component 128 may include a prompt providing module 240 and an input receiving module 242. The prompt component 128 may display a prompt such as prompt 604 in FIG. 6. The prompt may include instructions (e.g., "open the second application," "go to your account on the second application," "make sure the second-screen device is on the same network as the first-screen device," etc.). The prompt may include a status (e.g., "searching for the second-screen device," etc.). The prompt may include prompt input elements (e.g., "try another way," "cancel," etc.). The input receiving module 242 may receive input via the prompt input elements. For example, if the prompt input element of "try another way" is selected by a user, the input receiving module 242 may cause the prompt providing module 240 to display a prompt with another method of logging in to the first application (e.g., typing the username and password into the first application using a d-pad of a remote control, etc.). In another example, if the prompt input element of "cancel" is selected by a user, the prompt component 128 may cease displaying a prompt (e.g., the first application may display the previous activity, a home screen, etc.).

Figure 2B:
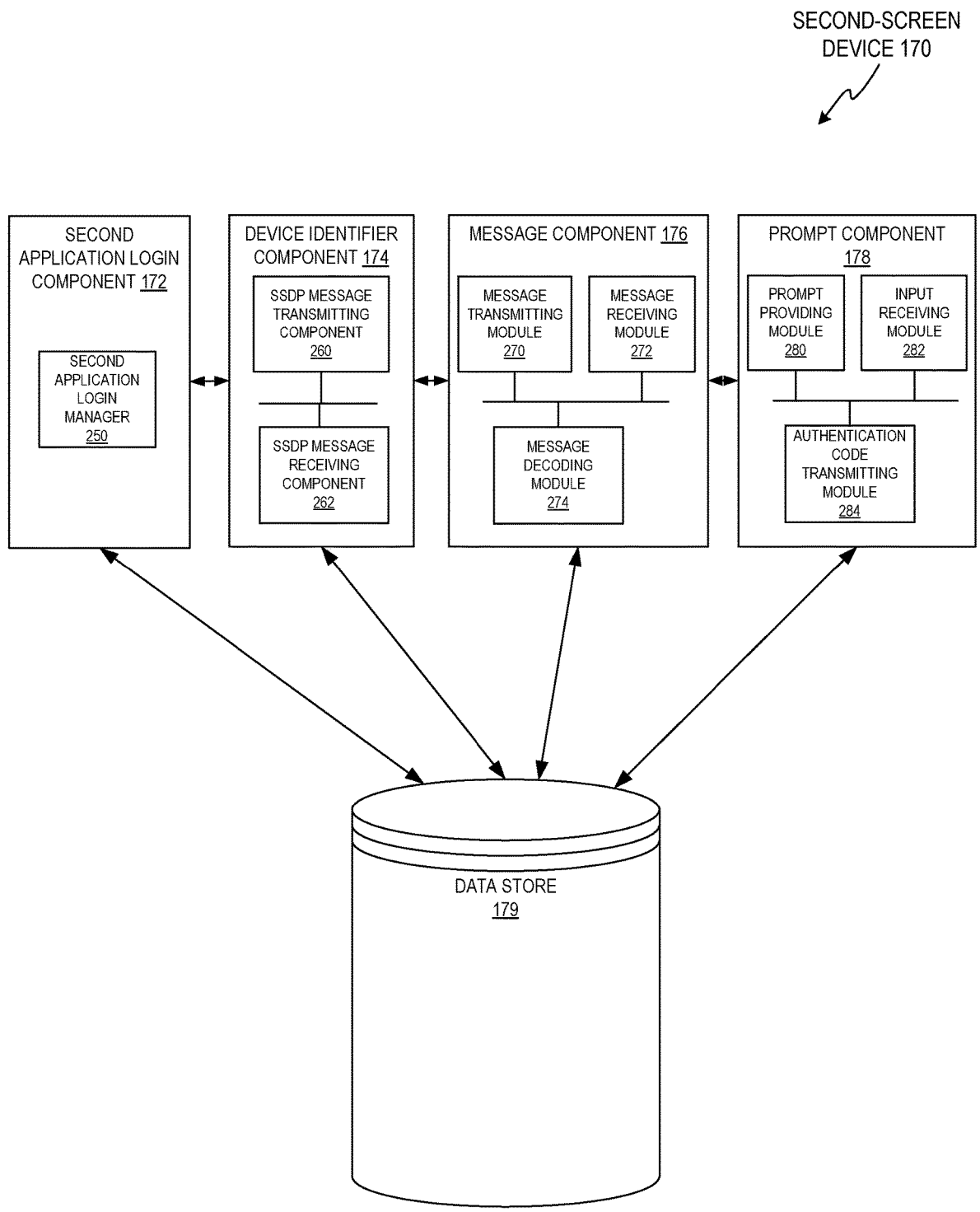
FIG. 2B is a block diagram illustrating the components and modules of a second-screen device, in accordance with an implementation of the disclosure.

FIG. 2B is a block diagram illustrating the second-screen device 170. In the example shown in FIG. 2B, the second-screen device 170 includes a second application login component 172, a device identifier component 174, a message component 176, and a prompt component 178 coupled to data store 179.

Second application login component 172 includes a second application login manager 250. The second application login manager 250 may receive the username and password via the second application hosted by the second-screen device. The second application login manager 250 may transmit the username and password to the authentication server 130 and receive credentials to perform the user authentication for user login into the second application. After logging in, the second application may have access to personalized information (e.g., playlists, watch history, purchase history) and the second application may perform actions (e.g., create playlists, make purchases, etc.). The second application may be associated with one or more accounts. If the second application is associated with multiple accounts, upon sign in (e.g., login), one of these multiple accounts may be used as a default account (e.g., for making purchases, etc.) or the user may be requested to select which account should be used for having access to personalized information, for performing actions, etc. In some implementations, it is more convenient for a user to login to an account through a second-screen device 170 (e.g., via a second application hosted by the second-screen device 170) than through a first-screen device 120 (e.g., via a first application hosted by the first-screen device 120).

Device identifier component 174 includes a SSDP message transmitting component 260 and a SSDP message receiving component 262. The SSDP message transmitting component 260 may transmit a first SSDP message via the network. In some implementations, the SSDP message transmitting component 260 broadcasts the first SSDP message to be detected by devices that are communicably coupled to the network, such as the first-screen device 120. The SSDP message receiving component 262 receives the second SSDP message from the first-screen device 120 in response to the first-screen device 120 receiving the first SSDP message. In response to receiving the second SSDP message, the device identifier component 174 identifies the first-screen device 120. In some implementations, a protocol other than SSDP is used to identify the first-screen device 120.

The message component 176 may include a message transmitting module 270, a message receiving module 272, a message decoding module 274. In response to the device identifier component 174 identifying the first-screen device 120, the message transmitting module 270 may transmit a first message to the first-screen device 120 (e.g., query the DIAL URL of the first-screen device 120, transmit a DIAL Application Status HTTP request). Subsequent to the message transmitting module 270 transmitting the first message, the message receiving module 272 may receive a message (e.g., DIAL URL response, DIAL Application Status HTTP request response, etc.) transmitted by the first-screen device 120 in response to the first message. The message decoding module 274 may decode the message to determine the first application is requesting user authentication for automated user input. The message decoding module may decode the message to determine the authentication code 114 transmitted from the authentication server 130 to the first-screen device 120.

Prompt component 178 may include a prompt providing module 280, an input receiving module 282, and an authentication code transmitting module 284. The prompt providing module 280 may present a prompt for user input pertaining to automated user login. The prompt providing module 280 may provide a prompt 704 shown in FIG. 7. For example, the prompt providing module 280 may provide a prompt for user input indicating user acceptance of the automated user login into the first application. The input receiving module 282 may receive user input. For example, the user input may be user acceptance of automated user login into the first application via an account. In another example, the user input is to switch accounts. In another example, the user input is to cancel the request or deny access to the account. The authentication code transmitting module 284 may transmit the authentication code 114 to the authentication server 130 in response to receiving user input indicating user acceptance of the automated user login. The authentication code transmitting module 284 may transmit the authentication code 114 and an indication of the account corresponding to the user input indicating user acceptance of the automated user login.

Figure 3:
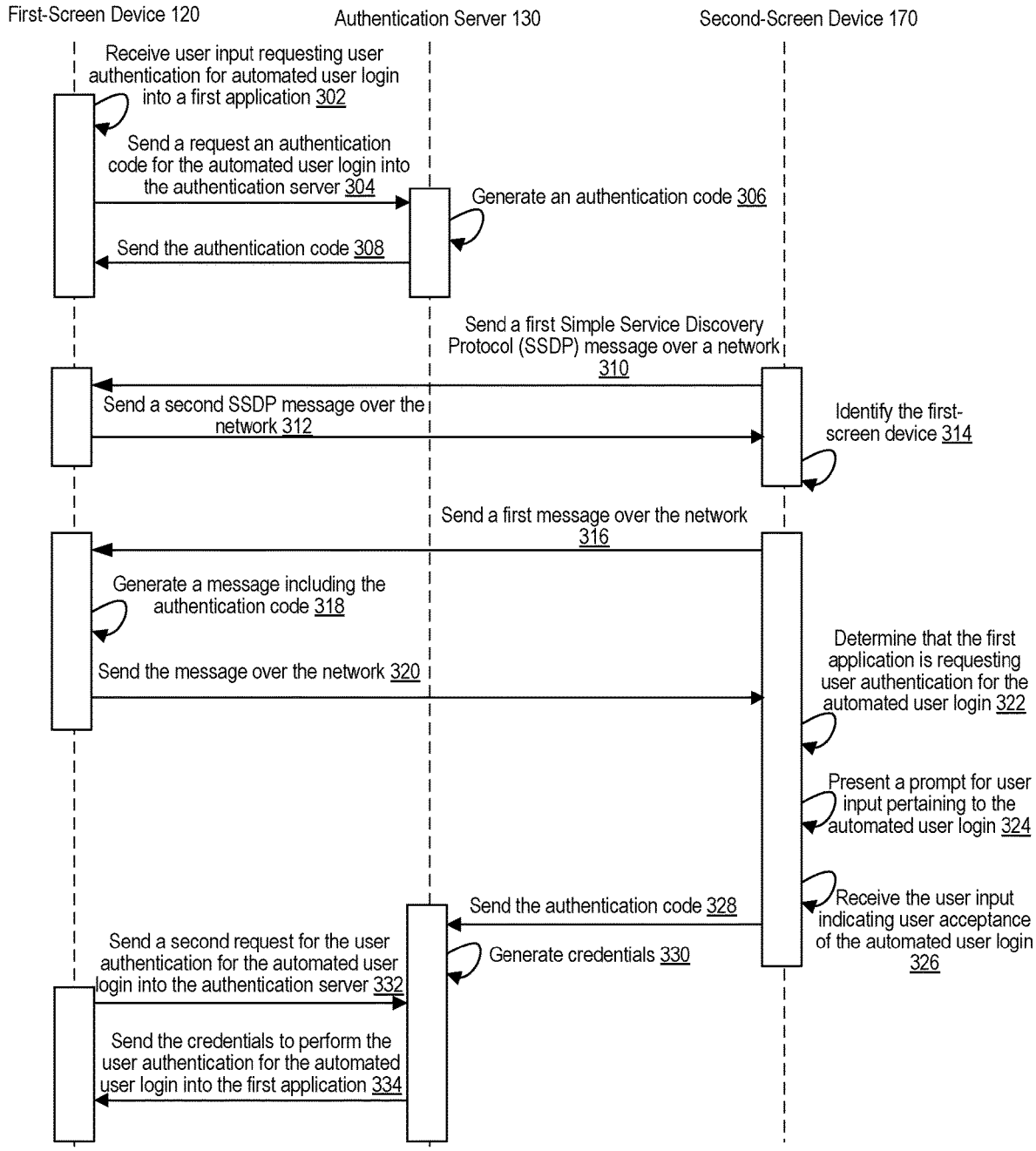
FIG. 3 is a sequence diagram for facilitating automated user login into a first application hosted by a first-screen device, in accordance with an implementation of the disclosure.

FIG. 3 depicts a sequence diagram 300 for facilitating automated user login into a first application hosted by a first-screen device 120, in accordance with one or more aspects of the present disclosure. As depicted, the sequence diagram 300 includes interactions between the first-screen device 120, the authentication server 130, and the second-screen device 170. The first-screen device 120 and the second-screen device 170 are on the same network (e.g., local network 140, etc.). The interactions depicted in the sequence diagram 300 can occur in various orders and/or concurrently, and with other interactions not presented and described herein. Furthermore, not all illustrated interactions may be required to implement the sequences in accordance with the disclosed subject matter.

The sequence diagram 300 may begin with the first-screen device 120 receiving (302) user input requesting user authentication for automated user login into a first application hosted by the first-screen device 120. In some implementations, the first-screen device 120 receiving (302) the user input is in response to a user launching the first application on the first-screen device 120. In some implementations, the first-screen device 120 receiving (302) the user input is in response to a user navigating to a login screen via the first application on the first-screen device 120. In some implementations, the first-screen device 120 receiving (302) the user input is in response to a user interacting with a login element (e.g., clicking on a login button) displayed via the first application on the first-screen device 120. The first-screen device 120 may send (304) a request to the authentication server 130 for an authentication code for the automated user login into the authentication server 130 (e.g., the user authentication for the automated user login into the first application) in response to receiving the user input. In some implementations, the first-screen device 120 may periodically send (304) the request for user authentication to the authentication server 130. The authentication server 130 may generate (306) an authentication code in response to receiving the request. In some implementations, the authentication server 130 randomly generates (306) the authentication code in response to receiving the request. The authentication server 130 may send (308) the authentication code to the first-screen device 120.

The second-screen device 170 may send (310) a first SSDP message to the first-screen device 120 over a network (e.g., local network 140). In some implementations, the second-screen device 170 broadcasts the first SSDP message (e.g., a first SSDP broadcast message) over the network. In some implementations, the second-screen device periodically sends (310) the first SSDP message to determine whether there is a first-screen device 120 communicably coupled to the same network as the second-screen device 170. In some implementations, the second-screen device periodically sends (310) the first SSDP message to determine whether there is a first-screen device 120 executing a first application that corresponds to a second application executing on the second-screen device 170 and that is communicably coupled to the same network as the second-screen device 170 (e.g., the first and second applications have functionalities to facilitate automated user login into a first application by user input via the second application). In some implementations, the second-screen device 170 sends (310) the first SSDP message in response to launching the second application on the second-screen device 170. In some implementations, the second-screen device 170 sends (310) the first SSDP message in response to receiving user input via the second application. The first-screen device 120 may send (312) a second SSDP message to the second-screen device 170 in response to receiving the first SSDP message (e.g., detecting the first SSDP broadcast message). The first-screen device 120 may send (312) the second SSDP message to provide a confirmation (e.g., that the first-screen device 120 is communicably coupled to the same network as the second-screen device 170, that the first-screen device 120 is executing the first application corresponding to the second application, etc.). The second-screen device 170 may identify (314) the first-screen device 120 (e.g., as being communicably coupled to the same network, as executing a first application that corresponds to the second application, etc.) in response to receiving the second SSDP message.

The second-screen device 170 may send (316) a first message (e.g., DIAL Application Status HTTP request, DIAL URL request) to the first-screen device 120 over the network. In some implementations, the second-screen device 170 sends (316) the first message to determine whether any identified first-screen devices 120 are requesting user authentication. In some implementations, the second-screen device 170 sends (316) the first message in response to identifying (314) the first-screen device. In some implementations, the second-screen device 170 periodically sends (316) the first message to any first-screen device that the second-screen device 170 has identified. The first-screen device 120 may generate (318) a message (e.g., DIAL Application Status HTTP request response, DIAL URL message) including the authentication code (e.g., generate a DIAL URL and append the authentication code to the DIAL URL) in response to receiving the first message. The first-screen device 120 may send (320) the message to the second-screen device 170 over the network in response to generating the message. In some implementations, the first-screen device 120 broadcasts the message and any second-screen device may receive (e.g., detect) the message. In some implementations, the first-screen device 120 sends (320) the message to the second-screen device 170 that sent (316) the first message. The first-screen device 120 may send (320) the message to the second-screen device 170 to provide a confirmation that the first-screen device 120 is requesting user authentication. The second-screen device 170 may determine (322) the first application is requesting user authentication for the automated user login in response to receiving the message. In some implementations, the second-screen device 170 determines (322) the first application is requesting user authentication by decoding the message and identifying the authentication code. The second-screen device 170 may present (324) a prompt for user input indicating user acceptance of the automated user login in response to determining the first application is requesting user authentication.

In some implementations, the second application hosted by the second-screen device 170 is logged into one or more accounts (e.g., the second-screen device previously sent login credentials corresponding to the one or more accounts to the authentication server 130 to sign into the second application via the one or more accounts) and the second-screen device 170 presents (324) a prompt including a corresponding acceptance element for each of the one or more accounts. The user may select (e.g., click on) one of the acceptance elements corresponding to an account to indicate user acceptance of the automated user login into the first application via the account. In some implementations, the second-screen device 170 presents (324) a prompt for user input for the user to enter login credentials (e.g., username and password) via the second application (e.g., the user has not logged into the second application).

The second-screen device 170 may receive (326) the user input indicating the user acceptance of the automated user login in response to presenting the prompt. In some implementations, the user input is selecting an acceptance element corresponding to an account (e.g., user input choosing an account to grant the first application to use that account). In another element, the user input is entering of a username and/or password. In some implementations, the user input is a biometrics identifier (e.g., a thumbprint, a fingerprint, an eye scan, etc.).

The second-screen device 170 may send (328) the authentication code from the message to the authentication server 130 in response to receiving the user input. The authentication server 130 may generate credentials in response to receiving the authentication code. In some implementations, the credentials may be login information to log into the first application hosted by the first-screen device. In some implementations, the credentials may be login information corresponding to an account indicated in the user input to log into first application hosted by the first-screen device.

The first-screen device 120 may send (332) a second request for the user authentication for the automated user login into the authentication server 130 (e.g., into the first application hosted by the first-screen device 120). In one implementation, the first-screen device periodically sends the request for the user authentication to the authentication server 130 after receiving (302) the user input and prior to receiving credentials. In some implementations, the second request is the same as the first request sent (304) by the first-screen device 120. The authentication server 130 may send (334) the credentials to the first-screen device 120 to perform the user authentication for the automated user login into the first application.

Figure 4A:
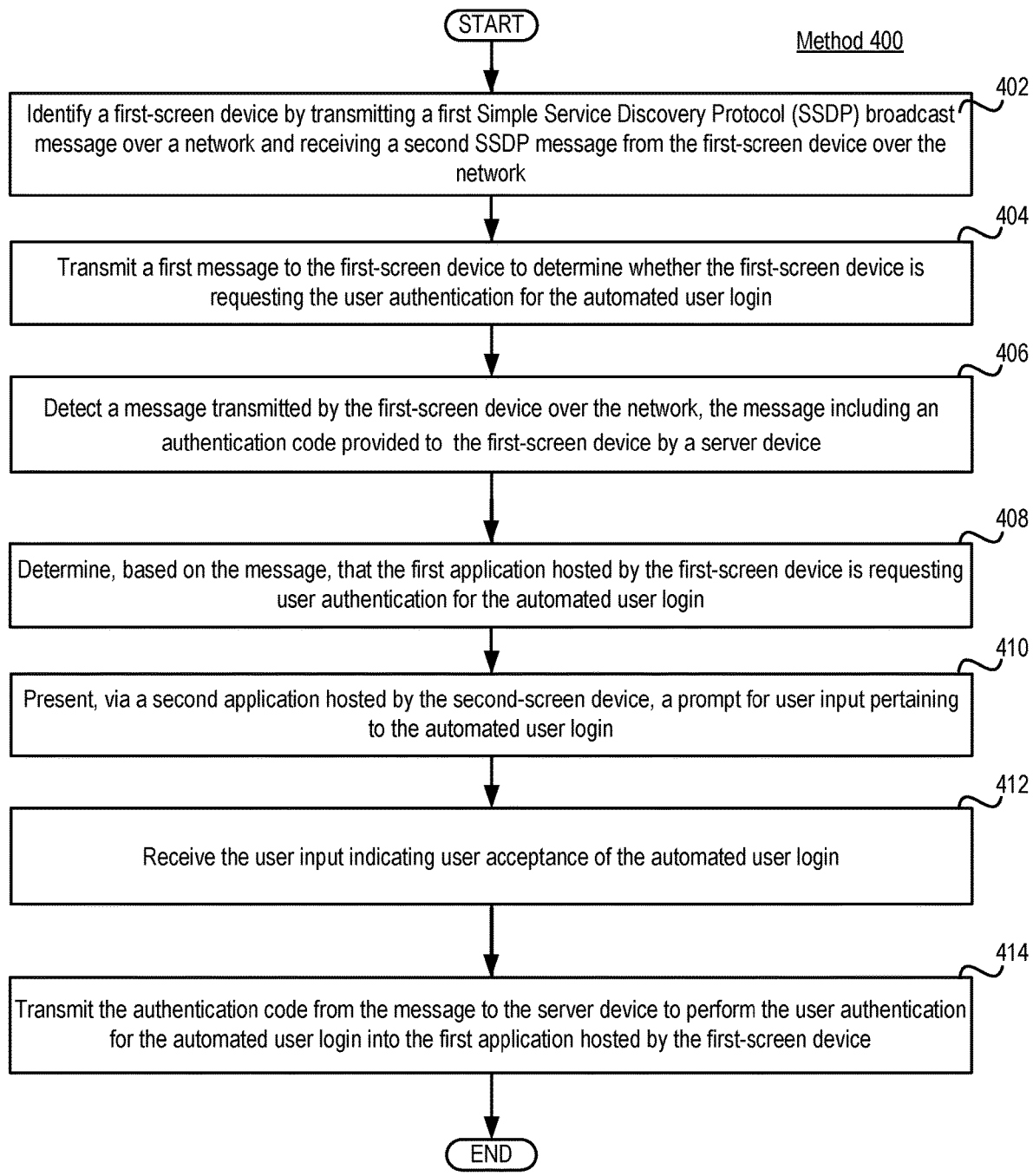
FIGS. 4A-C are flow diagrams illustrating example methods of facilitating automated user login into a first application hosted by a first-screen device, in accordance with an implementation of the disclosure.
Figure 4B:
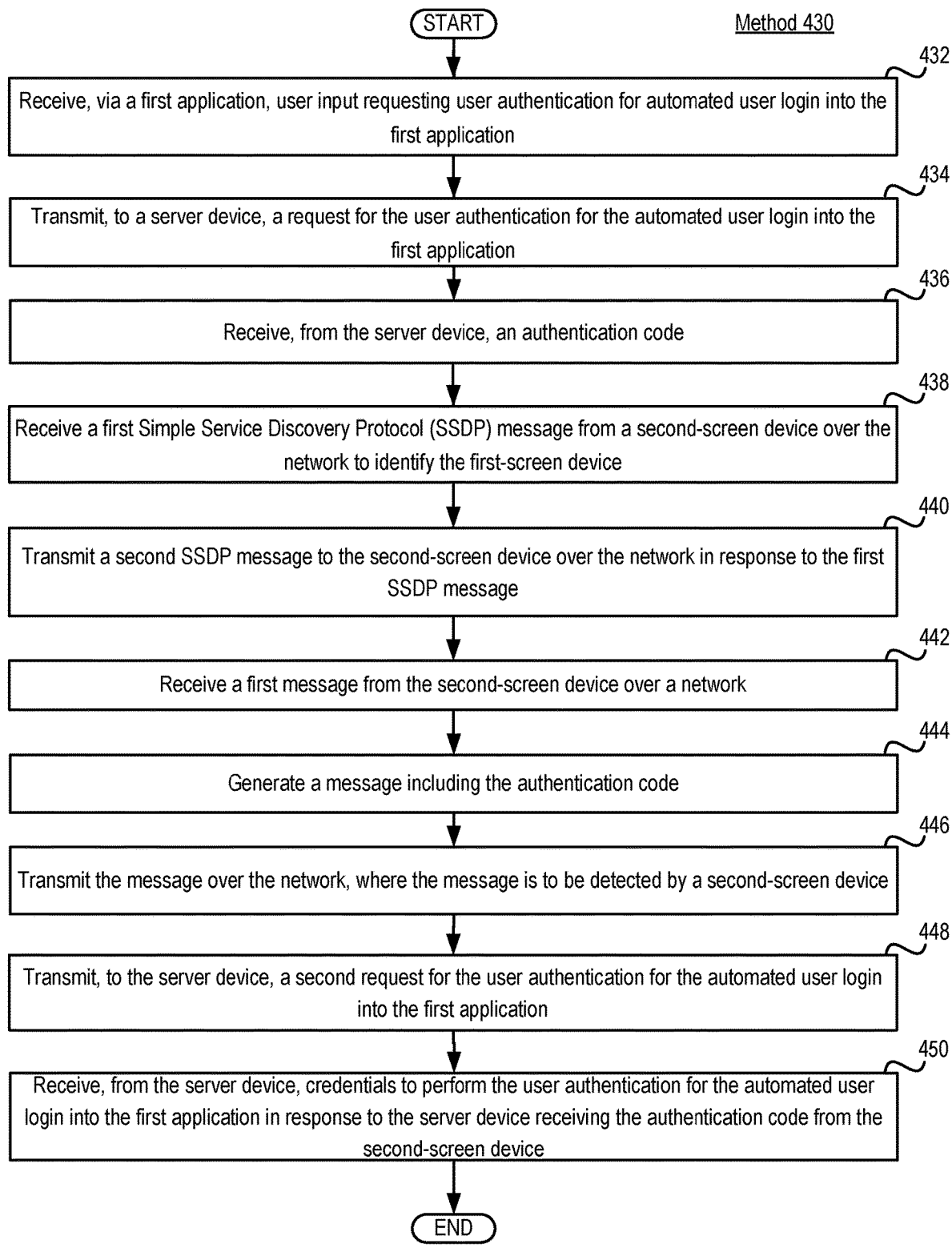
Figure 4C:
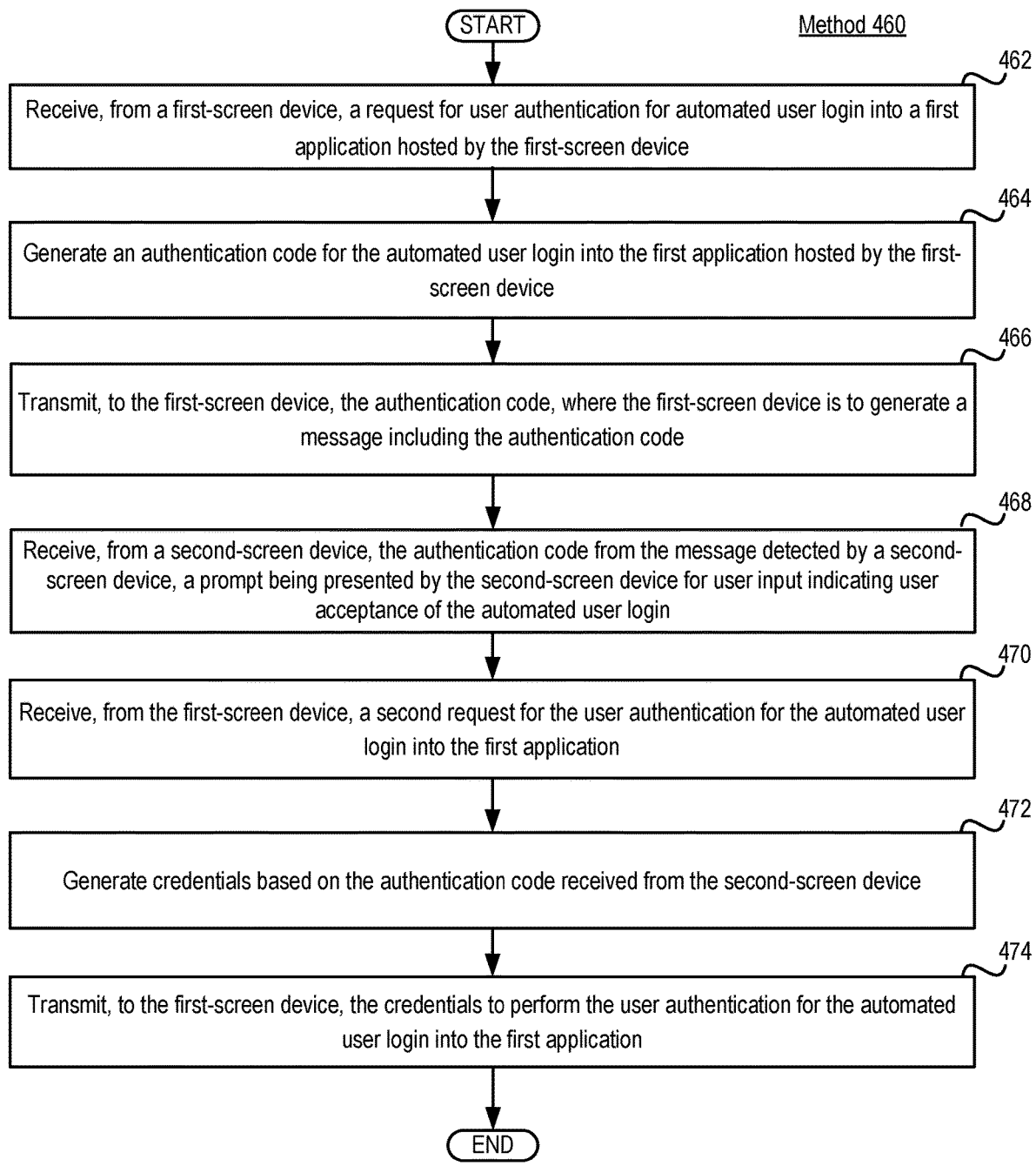

FIGS. 4A-C depict flow diagrams for illustrative examples of methods 400, 430, and 460 for facilitating automated user login into a first application hosted by a first-screen device 120. Method 400 is an example method from the perspective of a second-screen device. Method 430 is an example method from the perspective of a first-screen device. Method 460 is an example method from the perspective of a server device. Methods 400, 430, and 460 may be performed by processing devices that may include hardware (e.g., circuitry, dedicated logic), software (such as is run on a general purpose computer system or a dedicated machine), or a combination of both. Methods 400, 430, and 460 and each of their individual functions, routines, subroutines, or operations may be performed by one or more processors of the computer device executing the method. In certain implementations, methods 400, 430, and 460 may each be performed by a single processing thread. Alternatively, methods 400, 430, and 460 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. For example, a non-transitory machine-readable storage medium may store instructions which, when executed, cause a processing device (e.g., of a first-screen device 120, authentication server 130, second-screen device 170, etc.) to perform operations including methods disclosed within. In one implementation, method 400 may be performed by second-screen device 170 of FIG. 1, method 430 may be performed by first-screen device 120 of FIG. 1, and method 460 may be performed by authentication server 130 of FIG. 1.

Referring to FIG. 4A, method 400 may be performed by one or more processing devices of a second-screen device 170 for facilitating automated user login into a first application hosted by a first-screen device 120.

Method 400 may begin at block 402 where the processing device may identify the first-screen device 120 by transmitting a first SSDP message (e.g., a first SSDP broadcast message) to the first-screen device 120 over a network and receiving a second SSDP message from the first-screen device 120 over the network. In some implementations, the first SSDP message transmitted over the local network 140 and the first SSDP message is a request inquiring whether there is a first-screen device communicably coupled to the local network 140. In some implementations, the second SSDP message is a response confirming that the first-screen device 120 is a first-screen device communicably coupled to the local network 140.

At block 404, the processing device may transmit a first message (e.g., DIAL Application Status HTTP request, DIAL URL request) to the first-screen device 120 to determine whether the first-screen device 120 is requesting user authentication for the automated user login. In some implementations, the processing device transmits the first message in response to identifying the first-screen device 120. In some implementations, the processing device periodically transmits the first message for a threshold amount of time (e.g., until timing out, until receiving the message from the first-screen device 120).

At block 406, the processing device may detect (e.g., receive) a message transmitted by the first-screen device 120 over the network. The message may include an authentication code provided to the first-screen device by a server device. In some implementations, the processing device periodically transmits the message until the processing device receives the message.

At block 408, the processing device may determine, based on the message, that the first application hosted by the first-screen device 120 is requesting user authentication for the automated user login. In some implementations, the processing device determines the first application is requesting user authentication in response to determining the message includes an authentication code. In some implementations, the processing device may decode the message to identify the authentication code.

At block 410, the processing device may present, via a second application hosted by the second-screen device, a prompt for user input pertaining to the automated user login. In some implementations, the prompt is an acceptance element for the user to select to approve logging into the first application. Each acceptance element may correspond to an account (e.g., the second application may be logged into the account prior to presenting the prompt). In some implementations, the prompt may be a prompt 704 displayed in FIG. 7.

At block 412, the processing device may receive the user input indicating user acceptance of the automated user login. In some implementations, the user input includes selecting (e.g., clicking on) an acceptance element (e.g., prompt input element 708*e* of FIG. 7). In some implementations, the user input includes selecting (e.g., clicking on) a visual representation of an account (e.g., an account avatar, an account tab, a photo, an image, a username, etc.). In some implementations, the user input includes a username and password.

At block 414, the processing device may transmit the authentication code from the message to the server device (e.g., authentication server 130) to perform the user authentication to the automated user login into the first application hosted by the first-screen device 120. In some implementations, the processing device transmits an indication of an account indicated in the user input for automated user login into the account in the first application.

Referring to FIG. 4B, method 430 may be performed by one or more processing devices of a first-screen device 120 for facilitating automated user login into a first application hosted by a first-screen device 120.

Method 430 may begin at block 432 where the processing device may receive, via a first application, user input requesting user authentication for automated user login into the first application. In some implementations, the receiving of the user input is in response to launching the first application on the first-screen device 120. In some implementations, the receiving of the user input is in response to navigating to the first application hosted by the first-screen device 120. In some implementations, the receiving of the user input is in response to a user selection of a login element on the first application. In some implementations, the receiving of the user input is in response to the first application being navigated to a login page. In some implementations, a prompt may be displayed via the first application. For example, prompt 604 illustrated in FIG. 6 may be displayed via the first application.

At block 434, the processing device may transmit, to a server device (e.g., authentication server 130), a request for the user authentication for the automated user login into the first application. The transmitting of the request may be in response to receiving of the user input requesting user authentication.

At block 436, the processing device may receive, from the server device, an authentication code. The processing device may store the authentication code in a data store of the first-screen device 120.

At block 438, the processing device may receive a first SSDP message (e.g., a first SSDP broadcast message) from a second-screen device over the network to identify the first-screen device and, at block 440. The processing device may transmit a second SSDP message to the second-screen device over the network in response to the first SSDP message. The first SSDP message may be a request inquiring if the processing device is part of a first-screen device 120 communicably coupled to the network and the second SSDP message may be a response confirming that the processing device is part of a first-screen device 120 communicably coupled to the network. Block 438 and 440 may occur at any point in method 430 before block 442 (e.g., before block 432, etc.).

At block 442, the processing device may receive a first message (e.g., DIAL query, a DIAL message, a DIAL request, a DIAL Application Status HTTP request, a query of the DIAL URL of the first-screen device 120, etc.) from the second-screen device. The first message may be a request inquiring if the processing device hosting a first application that is requesting user authentication.

At block 444, the processing device may generate a message (e.g., DIAL URL response, DIAL Application Status HTTP request response, etc.) including the authentication code. Generating the message may include generating a DIAL URL, retrieving the authentication code from the data store, and appending the authentication code to the DIAL URL. Block 444 may occur at any point after receiving the authentication code from the server device (block 436) and before transmitting the message (block 446) in method 430.

At block 446, the processing device may transmit the message over the network. The message may be detected by a second-screen device 170. The second-screen device 170 may present a prompt for user input indicating user acceptance of the automated user login and may transmit the authentication code to the server device in response to receiving user input.

At block 448, the processing device may transmit, to the server device, a second request for the user authentication for the automated user login into the first application. In some implementations, the second request is the same as the first request in block 434. In some implementations, the processing device periodically transmits requests for the user authentication until the request is canceled by the processing device (e.g., user input of cancelling the request, timing out of the request, etc.) or by the second-screen device 170 (e.g., user input of canceling the request, etc.).

At block 450, the processing device may receive, from the server device, credentials to perform the user authentication for the automated user login into the first application in response to the server device receiving the authentication code from the second-screen device 170. The processing device may use the credentials to login to the first application using an account corresponding to the credentials. In response to signing into the first application, the processing device may display user information (e.g., playlists, watch history, purchases, etc.) that corresponds to the account. In response to signing into the first application, the processing device may perform an action requested by the user (e.g., make a purchase, etc.) via the account that corresponds to the credentials.

Referring to FIG. 4C, method 460 may be performed by one or more processing devices of a server device (e.g., authentication server 130) for facilitating automated user login into a first application hosted by a first-screen device 120.

Method 460 may begin at block 462 where the processing device may receive, from a first-screen device 120, a request for user authentication for automated user login into a first application hosted by the first-screen device 120.

At block 464, the processing device may generate an authentication code for the automated user login into the first application hosted by the first-screen device 120. The processing device may randomly generate the authentication code. In one implementation, the authentication code is a random alphanumeric authentication code. The processing device may store the authentication code in a data store (e.g., authentication code cache 123 of data store 160).

At block 466, the processing device may transmit, to the first-screen device 120, the authentication code. The first-screen device 120 may generate and transmit a message (e.g., DIAL URL response, DIAL Application Status HTTP request response, etc.) including the authentication code. The second-screen device 170 may receive and decode the message to identify the authentication code.

At block 468, the processing device may receive the authentication code from the second-screen device 170. The processing device may further receive, from the second-screen device 170, an indication of an account for the automated user login into the first application in response to the second-screen device 170 receiving user input. The second-screen device 170 may receive user input in response to presenting, via the second-screen device 170, a prompt for user input indicating user acceptance of the automated user login. The indication of the account may be in response to the second-screen device 170 being logged into the account via the second application.

At block 470, the processing device may receive, from the first-screen device, a second request for the user authentication for the automated user login into the first application.

At block 472, the processing device may generate credentials based on the authentication code received from the second-screen device 170. The credentials may be for an account based on an indication of an account received from the second-screen device 170.

At block 474, the processing device may transmit, to the first-screen device, the credentials to perform the user authentication for the automated user login into the first application.

Figure 5:
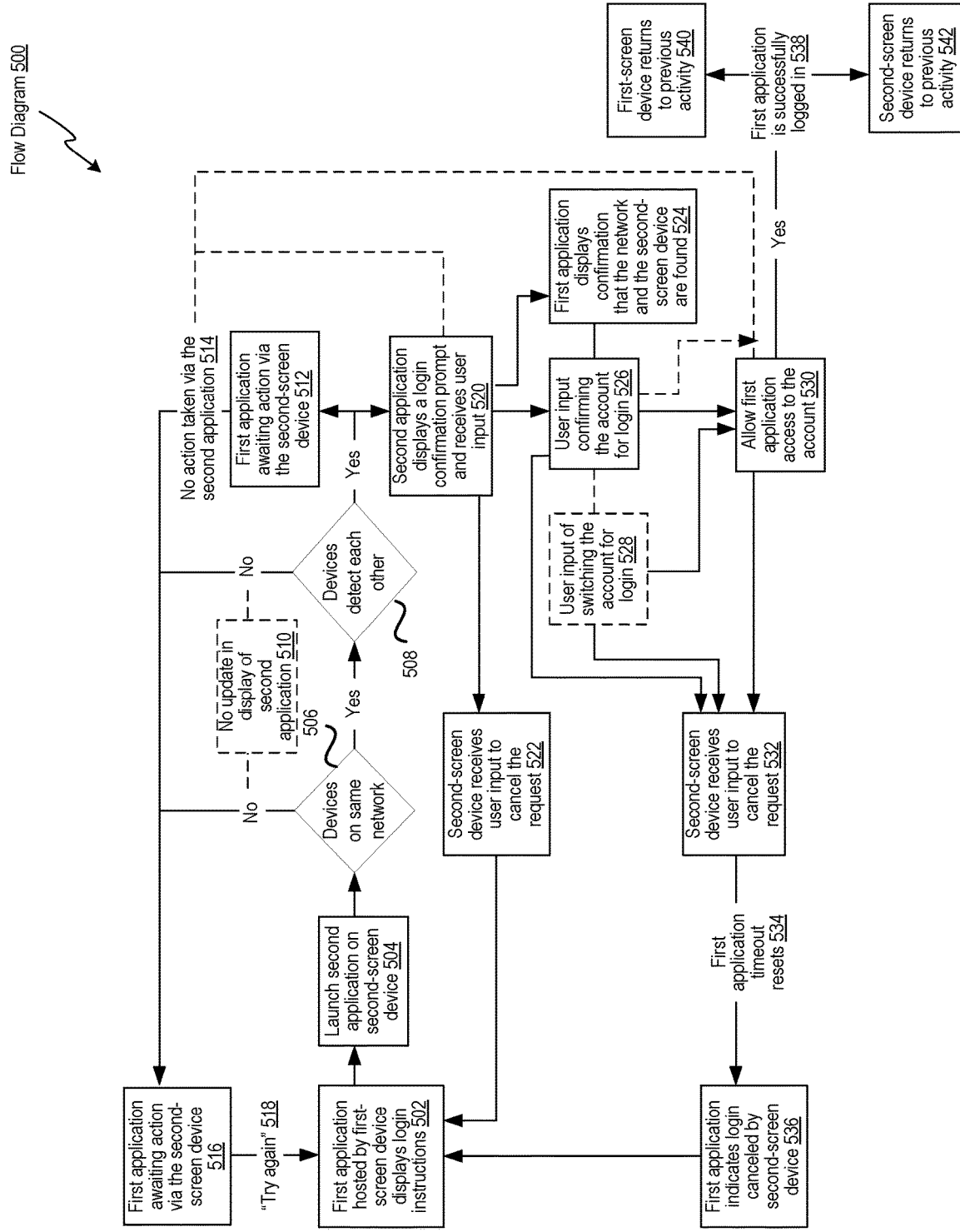
FIG. 5 is an example flow diagram for facilitating automated user login into a first application hosted by a first-screen device, in accordance with an implementation of the disclosure.

FIG. 5 is an example flow diagram 500 for facilitating automated user login into a first application hosted by a first-screen device 120.

At block 502, the first application hosted by the first-screen device 120 displays login instructions (e.g., television sign in prompt with instructions). In one implementation, the first-screen device 120 further displays a pending element (e.g., a spinner-timer, an object to represent the first-screen device 120 is waiting for input) and a status indication (e.g., "looking for your phone or tablet"). The first application may display login instructions in response to receiving user input requesting login to the first application. The first application may display login instructions in response to the first application being launched on the first-screen device 120. Method continues to block 504.

At block 504, the second application is launched on the second-screen device 170. The second-screen device 170 may receive user input to open the second application. Method continues to block 506.

At block 506, the second-screen device 170 determines whether the first-screen device 120 and the second-screen device 170 are on the same network (e.g., local network 140). If the first-screen device 120 and the second-screen device 170 are on the same network, the method continues to block 508. If the first-screen device 120 and the second-screen device 170 are not on the same network, the method continues to block 510 and then block 516.

At block 508, the second-screen device 170 determines whether the second-screen device 170 can detect the first-screen device 120. In some implementation, block 508 further includes the first-screen device 120 determining whether the first-screen device can detect the second-screen device 170. The devices may detect each other by the sending and receiving of SSDP messages. If the second-screen device 170 does detect the first-screen device 120, the method continues to block 512 or block 520. If the second-screen device 170 does not detect the first-screen device 120, the method continues to block 510 and then block 516.

At block 510, the second application hosted by the second-screen device 170 does not update the display of the second application. For example, the second application does not display an indication that the first-screen device 120 has been detected or is awaiting login.

At block 512, the first application is awaiting action by the second-screen device 170. For example, the first application may be awaiting user input via the second application to accept the login via the first application. In one implementation, the first application may not update the display of the first application. Method continues to 514.

At 514, if no action is taken via the second application, the method continues to block 516. In one implementation, if user input indicating user acceptance of the automated user login is not received, the method continues to 516.

At block 516, the first application is awaiting action via the second-screen device. In one implementation, the prompt displayed via the first application times out after a threshold amount of time and the method continues to 518.

At 518, another chance to login may be granted (e.g., try again) and method continues to block 502 where the first application displays login instructions. The first application may display updated login instructions in block 510. The updated login instructions may include a second prompt with one or more methods of logging in to the first application. The one or more methods of logging in may include a URL method that may include typing a URL into the second application, typing a username and password into the second application, and typing a code displayed via the first application into the second application. The one or more methods of logging in may include entering the username and password directly into the first application via a remote control (e.g., a d-pad). The one or more methods of logging in may include the automated user login method described in methods 400, 430, and 460.

At block 520, the second application displays a login confirmation prompt and the second-screen device 170 receives user input via the second application. In one implementation, the user input may be a selection of "continue" (e.g., prompt input element 708*a* in FIG. 7). Method continues to one or more of block 522, 524, or 526.

Figure 7:
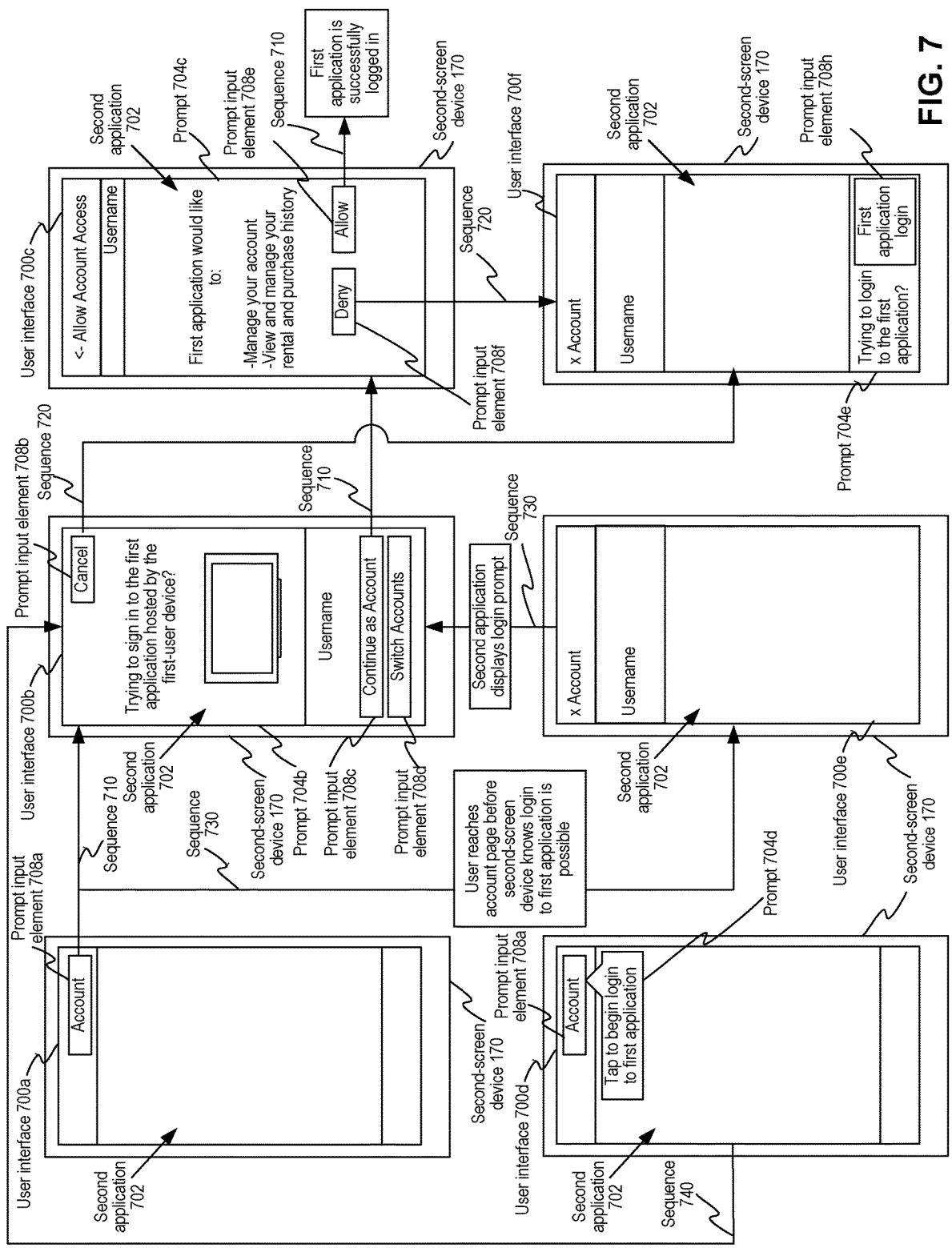
FIG. 7 is example graphical interfaces displayed via a second application hosted by a second-screen device for facilitating automated user login into a first application hosted by a first-screen device, in accordance with an implementation of the disclosure.

At block 522, the second-screen device 170 receives user input via the second application to cancel login (e.g., prompt input element 708*b* of FIG. 7). In one implementation, the second application displays a cancel element that the user may accept (e.g., click on a cancel button). Method continues to block 502.

At block 524, the first application displays a confirmation that the first-screen device 120 has found the second-screen device 170 and the network. Method continues to block 526.

At block 526, the second-screen device 170 receives user input confirming the account for login (e.g., prompt input element 708*c* of FIG. 7). Method continues to block 528, 530, or 532.

At block 528, the user input confirming the account for login may be user input of switching the account for login (e.g., prompt input element 708*d* of FIG. 7). Method continues to block 530 or 532.

At block 530, the second application displays a prompt to confirm whether to allow the first application to have access to the account (e.g., prompt input element 708*e* of FIG. 7). Method may continue to block 532 in response to the user input indicating "cancel" or "deny" (e.g., prompt input element 708*f* of FIG. 7) or to block 538 in response to the user input indicating "yes" or "allow" (e.g., prompt input element 708*e* of FIG. 7).

At block 532, the second application receives user input to cancel the request or deny access to the account (e.g., prompt input element 708*f* of FIG. 7). Method continues to 534.

At 534, the first application timeout resets. In some implementations, the first application displays login instructions (see block 502) for a threshold amount of time or until the timeout resets (e.g., cancel is selected on the second-screen device 170). Method continues to block 536.

At block 536, the first application displays a prompt indicating login was canceled by the second-screen device 170 (e.g., in response to user interaction with the second application). Method continues to block 502.

At block 538, the first application is successfully logged in. In one implementation, the first application is successfully logged in by the second-screen device 170 receiving an authentication code from the first-screen device 120, the second-screen device 170 transmitting the authentication code to the authentication server 130, and the authentication server 130 performing the user authentication for the automated user login into the first application hosted by the first-screen device 120.

At block 540, the first application returns to previous activity (e.g., what the first application was displaying prior to displaying the login instructions in block 502). The first application may also display an indication that login was successful (e.g., a login success toast).

At block 542, the second application returns to previous activity (e.g., what the first application was displaying prior to displaying the login confirmation prompt). The second application may also display an indication that login was successful (e.g., a login success toast).

Figure 6:
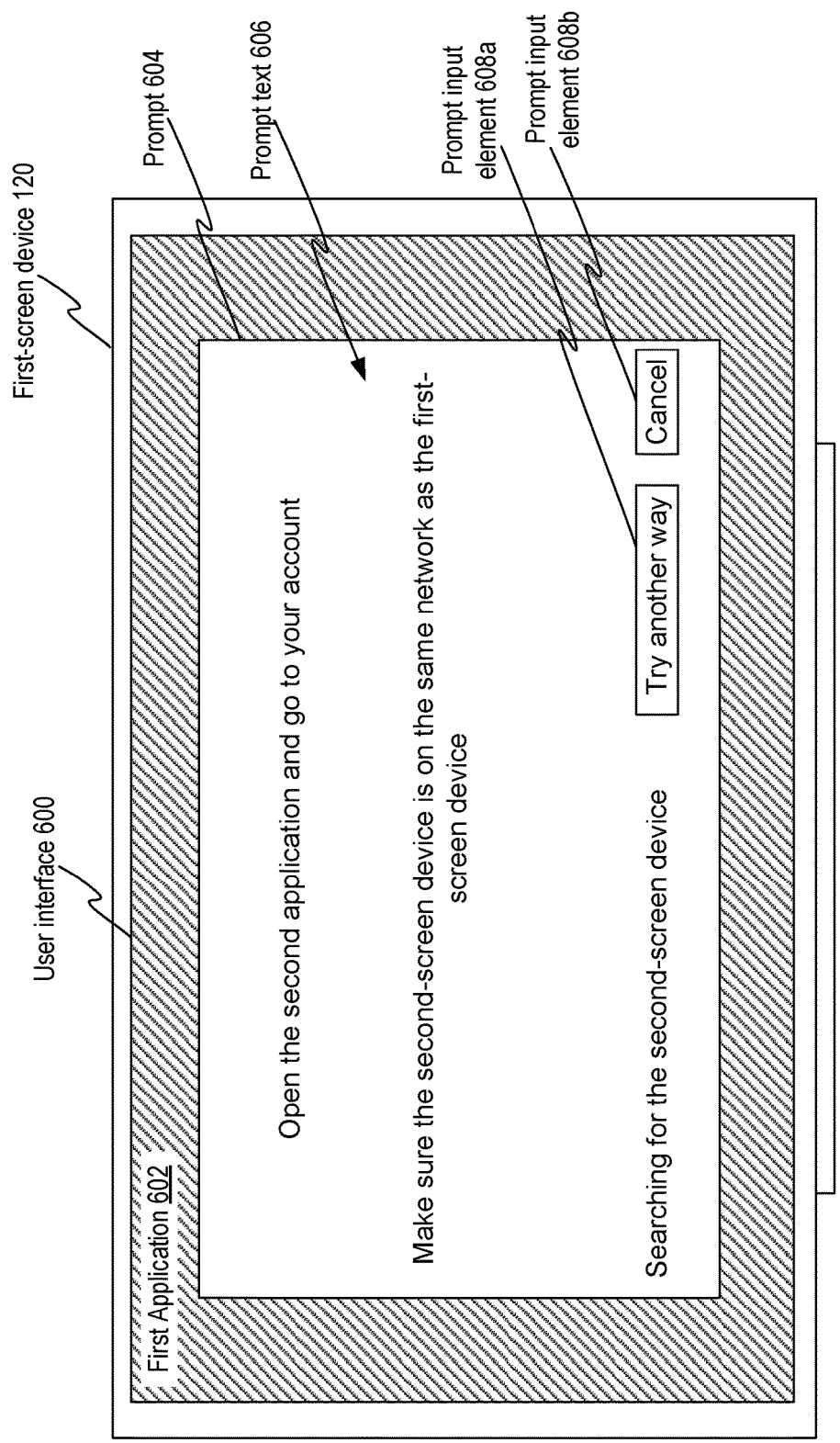
FIG. 6 is an example graphical interface displayed via a first application hosted by a first-screen device for facilitating automated user login into the first application, in accordance with an implementation of the disclosure.

FIG. 6 is an example graphical interface 600 displayed via a first application 602 hosted by a first-screen device 120 for facilitating automated user login into the first application 602, in accordance with an implementation of the disclosure.

The first application 602 may display a prompt 604. In one implementation, the prompt 604 is displayed in front of the most recent activity displayed on the first application 602 (e.g., a home page, a media item that is playing, an item that is to be purchased, etc.). The portion of the first application 602 that is displayed behind the prompt 604 may be obscured (e.g., shaded, faded, etc.).

In some implementations, the prompt 604 is displayed in response to receiving user input requesting user authentication for automated user login into the first application. For example, the user input may be launching the first application 602. In another example, the user input may be selecting a login element displayed via the first application 602. In another example, the user input may be navigating to a login screen displayed via the first application 602. In some implementations, the prompt is 604 displayed in response to the first-screen device 120 receiving a message from the second-screen device 170. For example, the message may be a first SSDP message received from the second-screen device 170. In another example, the message may be a DIAL message received from the second-screen device 170. In another example, the message may be a message of another type of protocol received from the second-screen device 170.

The prompt 604 may include prompt text 606 and one or more prompt input elements 608. The prompt text 606 may indicate instructions for facilitating automated user login into the first application 602. For example, the prompt text 606 may include an indication to launch the second application on the second-screen device 170. In another example, the prompt text 606 may include an indication to login to an account via the second application on the second-screen device. In another example, the prompt text 606 may include instructions to connect the second-screen device 170 to the same network (e.g., local network 140) as the first-screen device 120. In another example, the prompt text 606 may include an indication of the progress in facilitating automated user login (e.g., "searching for the second-screen device"). The one or more prompt input elements 608 may include a prompt input element 608a to try another way to login (e.g., typing the username and password via the d-pad of the remote control, typing a URL, a code, a username, and a password in the second-screen device 170, etc.) and a prompt input element 608b to cancel the login request.

The prompt 604 may update the login instructions in response to the prompt being displayed for a threshold amount of time (e.g., timing out). The prompt 604 may update the login instructions in response to identifying the second-screen device 170 via the network. The prompt 604 may update the login instructions in response to the second application hosted by the second-screen device 170 receiving user input (e.g., canceling the login request, selecting an account, user acceptance of login into the first application, etc.).

FIG. 7 displays example user interfaces 700a, 700b, 700c, 700d, 700e, and 700f displayed via a second application 702 hosted by a second-screen device 170 for facilitating automated user login into a first application 602 hosted by a first-screen device 120, in accordance with an implementation of the disclosure. FIG. 7 also displays sequences 710, 720, 730, and 740 between the different user interfaces 700.

User interface 700a displays a second application 702 and a prompt input element 708a. Prompt input element 708a may be displayed when the user interface 700a is displaying a home screen and when a user is browsing content items displayed via the user interface 700a. The prompt input element 708a may include a visual representation of an account into which the second application is logged in. For example prompt input element 708a may include an image corresponding to the account (e.g., a profile picture, an avatar, etc.). In another example, the prompt input element 708a may include an identifier for the account (e.g., a username, the profile name of the user corresponding to the account, an email address corresponding to the account, an account name, etc.). The prompt input element 708a may be an icon (e.g., a "TV assist" icon) that the user can select to initiate logging in to the first application 602. Upon user input selecting the prompt input element 708a, sequence may continue to user interface 700b (sequence 710) or sequence may continue to user interface 700e (sequence 730).

Sequence 710 may occur if the second-screen device 170 has determined the first application 602 is requesting user authentication. For example, the second-screen device 170 has identified the first-screen device 120 by sending a first SSDP message and receiving a second SSDP message and the second-screen device 170 has determined the first-screen device 120 is requesting user authentication by sending a first message (e.g., a DIAL message, a query of the DIAL URL, a DIAL Application Status HTTP request) and receiving a message (e.g., a DIAL URL response, a DIAL Application Status HTTP request response, etc.). Sequence 730 may occur if the second-screen device has not determined that the first application 602 is requesting user authentication. For example, the second-screen device 170 has not identified the first-screen device 120. In another example, the second-screen device 170 has not sent a message to the first-screen device 120. In another example, the second-screen device has not received an authentication code in a message (e.g., DIAL URL response, DIAL Application Status HTTP request response, etc.).

User interface 700b displays a second application 702 and a prompt 704b. In some implementations, the user interface 700b or prompt 704b may be an account selector page (e.g., account selector modal, mobile aware modal). The prompt 704b may include prompt text 706b (e.g., "trying to sign in to the first application hosted by the first-user device?," information identifying the username or account) and one or more prompt input elements 708. User input selecting prompt input element 708b may cancel logging in to the first application. The user interface 700b may further include a prompt to select the first-screen device 120 hosting the first application 602 for user login (e.g., the prompt may show one or more first-screen devices, other devices (cast devices, etc.) connected to the same network, etc.). Upon user input selecting prompt input element 708c, sequence 710 may continue to user interface 700c. User input selecting prompt input 708d may initiate switching the account for the automated user login.

User interface 700c displays a second application 702 and a prompt 704c. The prompt 704c may include prompt text 706c (e.g., "first application would like to: manage your account, view and manage your rental and purchase history, etc.) and one or more prompt input elements 708. User input selecting prompt input element 708e may indicate user acceptance of the automated user login and sequence 710 may continue to the first application being successfully logged in (e.g., second-screen device 170 may transmit the authentication code to the authentication server 130 to perform the user authentication for the automated user login into the first application). User input selecting prompt input element 708f may indicate user denial of the automated user login and sequence (720) may continue to user interface 700f.

User interface 700d displays a second application 702 and a prompt 704d. User interface 700d may be displayed if a user has not selected prompt input element 708a for a threshold amount of time. Prompt 704d may include instructions to select prompt input element 708a to begin login to the first application 602. Prompt 704d may be displayed for a second threshold amount of time or until a user dismisses the prompt 704d or selects the prompt input element 708a. Prompt 704d may not be displayed if login sequence (e.g., sequence 710) has been initiated (e.g., prompt input element 708a has been selected) by another second-screen device on the network. Upon user input selecting prompt input element 708a, sequence 740 continues to user interface 700b and may proceed as described above.

User interface 700e displays a second application 702. User interface may display user information (e.g., username, email address, profile picture, avatar, etc.) corresponding to an account that is logged in via the second application 702. User interface 700e may display account information. User interface 700e may be displayed in response to user selection of prompt input element 708a (e.g., selecting the account) prior to the second-screen device 170 determining the first application 602 is requesting user authentication for automated user login. Upon the second-screen device 170 determining the first application 602 is requesting user authentication, sequence 730 may continue to user interface 700b (e.g., account selector modal appears automatically) and may proceed as described above.

User interface 700f displays a second application 702. User interface may display user information corresponding to an account that is logged in via the second application 702. User interface 700f may display account information. User interface may be displayed in response to the second-screen device 170 determining the first application 602 is requesting user authentication for automated user login and the second application 702 receiving a cancelation (e.g., via prompt input element 708b displayed via user interface 700b) or denial (e.g., via prompt input element 708f displayed via user interface 700c) of the user authentication for the automated user login to the first application 602. User interface 700f may display a prompt 704e including prompt text 706e (e.g., "are you trying to login to the first application?," etc.) and prompt input element 708h (e.g., a toast prompt, a snackbar prompt, a small popup that allows interaction with other portions of user interface 700f while being displayed, a prompt that disappears after a threshold amount of time (e.g., a timeout)). Upon user input selecting prompt input element 708h sequence may continue to user interface 700b or 700c (e.g., the user interface 700 that was displayed immediately before being directed to user interface 700f).

Figure 8:
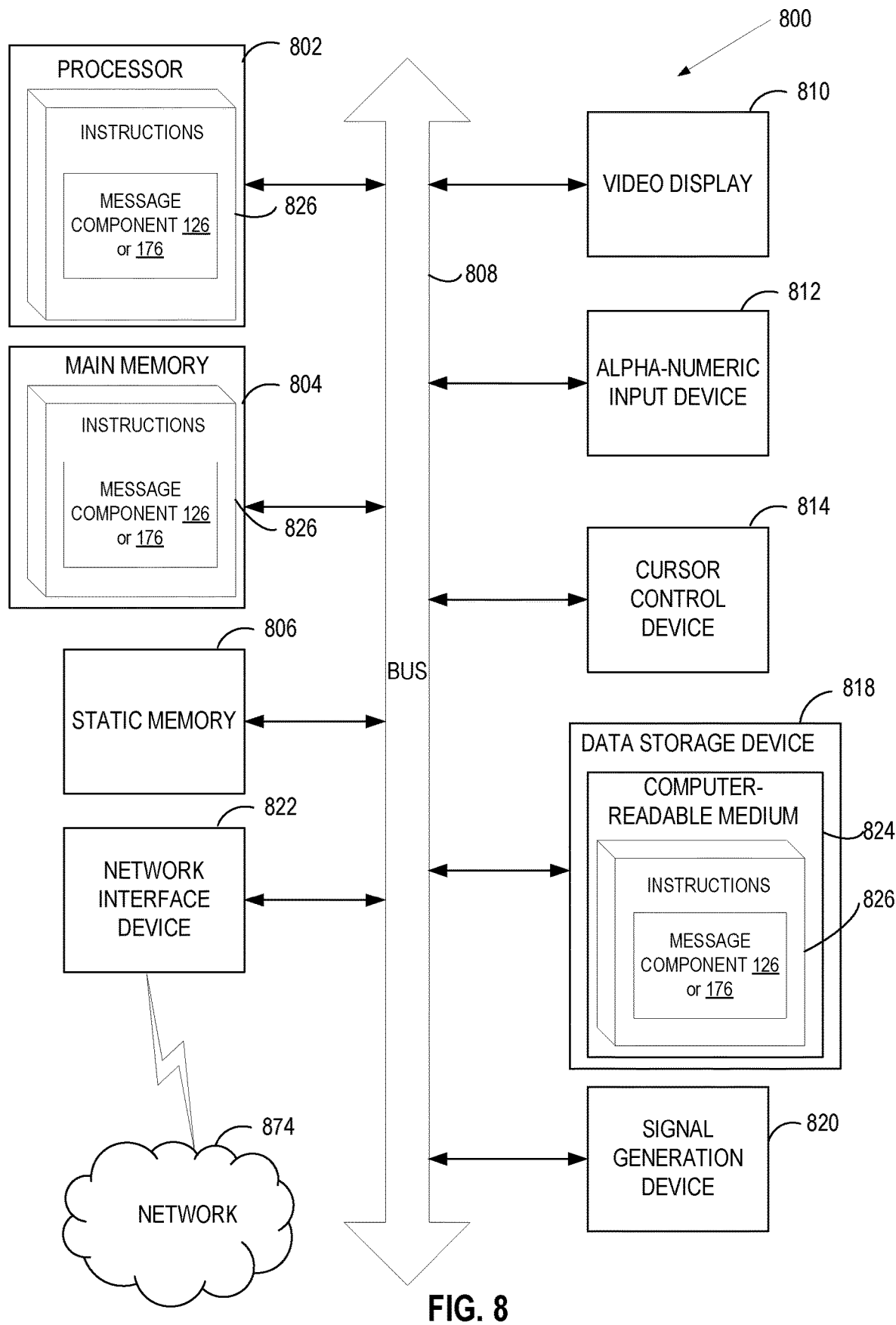
FIG. 8 is a block diagram illustrating one implementation of a computer system, in accordance with an implementation of the disclosure.

FIG. 8 is a block diagram illustrating one implementation of a computer system, in accordance with an implementation of the disclosure. In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., random access memory (RAM)), a non-volatile memory 806 (e.g., read-only memory (ROM) or electrically-erasable programmable ROM (EEPROM)), and a data storage device 816, which may communicate with each other via a bus 808.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 800 may further include a network interface device 822. Computer system 800 also may include a video display unit 810 (e.g., an LCD), an alpha-numeric input device 812 (e.g., a keyboard), a cursor control device 814 (e.g., a mouse), and a signal generation device 820.

Data storage device 816 may include a non-transitory computer-readable storage medium 824 on which may store instructions 826 encoding any one or more of the methods or functions described herein, including instructions encoding the message component 126 or 176 of FIG. 1 and for implementing methods 400, 430, or 460.

Instructions 826 may also reside, completely or partially, within volatile memory 804 and/or within processing device 802 during execution thereof by computer system 800, hence, volatile memory 804 and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "facilitating," "detecting," "determining," "presenting," "receiving," "transmitting," "identifying," "requesting," "generating," "authenticating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 400, 430, 460 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method for facilitating an automated user login into a first application hosted by a first-screen device, the method comprising:
   transmitting, by a second-screen device, a first message over a wireless network to the first-screen device to determine whether the first-screen device is requesting user authentication for the automated user login into the first application hosted by the first-screen device;
   responsive to receiving a second message via the wireless network from the first-screen device in response to the first message, presenting, via a second application hosted by the second-screen device, a prompt for user input indicating user acceptance of automated user login into the first application hosted by the first-screen device;
   receiving the user input indicating the user acceptance of the automated user login; and
   responsive to receiving the user input indicating the user acceptance of the automated user login, transmitting at least a portion of the second message to a server device to perform the user authentication for the automated user login into the first application hosted by the first-screen device.

2. The method of claim 1, wherein the at least a portion of the second message comprises an authentication code provided to the first-screen device by the server device.

3. The method of claim 1, wherein the user input further indicates a selection of an account, wherein the automated user login into the first application is with respect to the account.

4. The method of claim 3, wherein the transmitting of the at least the portion of the second message further comprises transmitting the selection of the account for the automated user login.

5. The method of claim 1 further comprising:
   identifying the first-screen device by transmitting a first Simple Service Discovery Protocol (SSDP) message to the first-screen device and receiving a second SSDP message from the first-screen device; and
   responsive to the identifying of the first-screen device, determining that the first-screen device is requesting the user authentication for the automated user login by the transmitting of the first message to the first-screen device.

6. The method of claim 1, wherein the second message is a Discovery and Launch (DIAL) Uniform Resource Locator (URL) response to a DIAL URL request transmitted by the second-screen device.

7. The method of claim 1 further comprising:
   decoding the second message to determine that the first application is requesting the user authentication for the automated user login.

8. A non-transitory machine-readable storage medium storing instructions which, when executed cause a processing device of a first-screen device to perform operations for facilitating an automated user login into a first application hosted by the first-screen device, the operations comprising:
   receiving, by the first-screen device, a first message over a wireless network from a second-screen device, the first message being transmitted by the second-screen device to determine whether the first-screen device is requesting user authentication for the automated user login into the first application hosted by the first-screen device;
   responsive to the receiving of the first message, transmitting, via the first-screen device over the wireless network, a second message intended for the second-screen device to prompt a user of the second-screen device to indicate acceptance of the automated user login; and
   receiving, from a server device, credentials to perform the user authentication for the automated user login into the first application, the received credentials indicating that at least a portion of the second message has been provided to the server device by the second-screen device.

9. The non-transitory machine-readable storage medium of claim 8, wherein the at least a portion of the second message comprises an authentication code provided to the first-screen device by the server device.

10. The non-transitory machine-readable storage medium of claim 8, wherein the received credentials further indicate that a selection of an account has been provided to the server device by the second-screen device, wherein the automated user login into the first application is with respect to the account.

11. The non-transitory machine-readable storage medium of claim 8, wherein the operations further comprise receiving, via the first application, user input requesting the user authentication for the automated user login into the first application prior to the transmitting of the second message.

12. The non-transitory machine-readable storage medium of claim 8, the operations further comprising:
   receiving a first Simple Service Discovery Protocol (SSDP) message from the second-screen device to identify the first-screen device; and
   transmitting a second SSDP message to the second-screen device in response to the first SSDP message, wherein the first-screen device is to be identified by the second-screen device in response to the transmitting of the second SSDP message, wherein the receiving of the first message is responsive to being identified by the second-screen device.

13. The non-transitory machine-readable storage medium of claim 8, wherein the second message is a Discovery and Launch (DIAL) Uniform Resource Locator (URL) response to a DIAL URL request transmitted by the second-screen device.

14. The non-transitory machine-readable storage medium of claim 8, wherein the user authentication for user login into a second application hosted by the second-screen device is to occur prior to the receiving of the credentials to perform the user authentication for the automated user login into the first application.

15. A system comprising:
   a memory to store instructions for facilitating an automated user login into a first application hosted by a first-screen device; and
   a processing device communicably coupled to the memory, the processing device to execute the instructions to:
      transmit, to the first-screen device, an authentication code intended for the first-screen device to generate a second message and to transmit, responsive to the first-screen device receiving a first message from a second-screen device over a wireless network, the second message over the wireless network to the second-screen device, the first message being transmitted by the second-screen device to determine whether the first-screen device is requesting user authentication for the automated user login into the first application hosted by the first-screen device;
      receive, from the second-screen device, at least a portion of the second message; and
      in response to receiving the at least a portion of the second message from the second-screen device, transmit, to the first-screen device, credentials to perform the user authentication for the automated user login into the first application.

16. The system of claim 15, wherein the at least a portion of the second message comprises the authentication code.

17. The system of claim 15, wherein the processing device is to receive the at least a portion of the second message from the second-screen device in response to user input via a second application hosted by the second-screen device, the user input indicating acceptance of the automated user login subsequent to detecting the second message.

18. The system of claim 17, wherein the user input further indicates a selection of an account, and wherein the automated user login into the first application is with respect to the account.

19. The system of claim 17, wherein the processing device is to perform the user authentication for user login into the second application hosted by the second-screen device prior to transmitting the credentials to the first-screen device to perform the user authentication for the automated user login into the first application.

20. The system of claim 15, wherein the second message is a Discovery and Launch (DIAL) Uniform Resource Locator (URL) response to a DIAL URL request transmitted by the second-screen device.

* * * * *